United States Patent [19]
Koizumi et al.

[11] Patent Number: 6,059,228
[45] Date of Patent: May 9, 2000

[54] HYDRAULIC SYSTEM

[75] Inventors: Takashi Koizumi; Kiyoshi Miyajima, both of Gifu, Japan

[73] Assignee: Teijin Seiki Co., Ltd., Osaka, Japan

[21] Appl. No.: 09/094,485

[22] Filed: Jun. 10, 1998

[30] Foreign Application Priority Data

Jun. 13, 1997 [JP] Japan .................................. 9-156631
Aug. 11, 1997 [JP] Japan .................................. 9-216082

[51] Int. Cl.[7] .................................................. B64C 25/10
[52] U.S. Cl. ............................... 244/102 R; 244/102 A; 244/102 SL; 60/381; 60/403; 60/406
[58] Field of Search ............................ 244/102 R, 102 A, 244/102 SL, 100 R; 60/370, 381, 403, 406

[56] References Cited

U.S. PATENT DOCUMENTS

| | | | |
|---|---|---|---|
| 2,331,108 | 10/1943 | Ganahl ................................ | 244/102 A |
| 2,892,626 | 6/1959 | Scott et al. .......................... | 244/102 R |
| 3,107,886 | 10/1963 | Bossler, Jr. ......................... | 244/102 R |
| 4,630,788 | 12/1986 | Veaux et al. ....................... | 244/102 A |
| 4,634,082 | 1/1987 | Kendall ............................... | 244/100 R |
| 5,184,465 | 2/1993 | Howard et al. ..................... | 60/403 |

*Primary Examiner*—J. Woodrow Eldred
*Attorney, Agent, or Firm*—Lane, Aitken & McCann

[57] ABSTRACT

A hydraulic system for retracting into and extending out of the body of an aircraft a landing gear for use in taking off and landing, comprises a housing unit which has a hydraulic pump, a hydraulic actuator, a shuttle valve, an emergency valve, an actuator pressure releasing mechanism, and a mechanically locking mechanism accommodated therein. The hydraulic actuator has a piston rod assembly received therein to be reciprocably moved by the hydraulic pump to assume a retraction position and an extended position. The shuttle valve is movable with respect to the housing unit for selectively changing the flow of the hydraulic fluid between the hydraulic pump and the hydraulic actuator. The emergency valve is movable with respect to the housing unit to assume two different positions for selectively changing the flow of the hydraulic fluid between the hydraulic pump and the hydraulic actuator and the flow of the hydraulic pump and the fluid pressure reservoir. The actuator pressure releasing mechanism serves to release the hydraulic pressure in the hydraulic actuator to allow the piston rod assembly to be freely moved with respect to the housing unit toward the extended position of the piston rod assembly. The mechanically locking mechanism is provided selectively to lock the piston rod assembly with the housing unit and to unlock the piston rod assembly from the housing unit to be freely moved.

17 Claims, 9 Drawing Sheets

HYDRAULIC SYSTEM

FIELD OF THE INVENTION

The present invention relates to a hydraulic system for retracting into and extending out of the body of an aircraft a landing gear for use in taking off and landing, and more particularly to a landing gear actuator for operating a landing gear of a relatively small aircraft when the aircraft is landing or taking off.

BACKGROUND OF THE INVENTION

In general, an aircraft has a body, a right wing, a left wing, a front landing gear assembly provided at the front lower portion of the body, a right wing landing gear assembly provided at the lower portion of the right wing, and a left wing landing gear assembly provided at the lower portion of the left wing. Each of the front landing gear assembly, the right wing landing gear assembly and the left wing landing gear assembly is hereinafter simply referred as "a landing gear" and generally comprises rubber wheels and an arm having the rubber wheels rotatably supported at the lower end portion thereof.

The landing gear is designed to be retracted into the body of the aircraft while it is flying at a cruising speed and to be extended from the body of the aircraft when it is landing and taking off and while it is moving on land. The reason why the landing gear is being retracted into the body of the aircraft while it is flying at a cruising speed is that the landing gear is liable to affect the flying performance of the aircraft such as cruising speeds and distances caused by air resistance of the landing gear. For this reason, the landing gear is required to be retracted into the body of the aircraft and extended from the body of the aircraft.

The landing gear of this type is generally operated by a hydraulic system which comprises a driving motor, a hydraulic pump driven by the driving motor, an actuator operatively connected to the landing gear and reciprocably moved by the hydraulic pump to retract the landing gear into the body of the aircraft and to expand the landing gear from the body of the aircraft with a hydraulic fluid supplied to the actuator and discharged from the actuator by the hydraulic pump, a hydraulic fluid reservoir for reserving the hydraulic fluid, a change-over valve for selectively changing the flow of the hydraulic fluid to supply the actuator with the hydraulic fluid and to discharge the hydraulic fluid from the actuator, and locking means for locking the landing gear with and unlocking the landing gear from the body of the aircraft when it is held at its retracted and extended positions.

There have so far been proposed various types of hydraulic systems one of which comprises a driving motor, a hydraulic pump driven by the driving motor, three sets of actuators for operating the landing gears of the front landing gear assembly, the right wing landing gear assembly and the left wing landing gear assembly, three sets of change-over valves each provided between the hydraulic pump and each of the actuators to selectively change the flow of the hydraulic fluid between the hydraulic pump and the actuator, and three sets of locking means each provided with each of the actuators to lock and retain the actuator at its retracted and extended position. The three sets of the actuators, change-over valves and locking means are arranged in separated and spaced relationship with each other and thus operatively connected by hydraulic pipes leading to only one hydraulic pump. The assembling of these parts for producing such an aircraft requires time-consuming and laborious works. This results in increasing overall expenses in production for aircraft.

It is therefore an object of the present invention to provide a hydraulic system which comprises a driving motor, a hydraulic pump, an actuator, a change-over valve, and locking means all of which are accommodated in a single housing unit with no hydraulic pipes needed for the conventional hydraulic systems.

It is another object of the present invention to provide a hydraulic system which does not require time-consuming and laborious works with no need for the above parts assembled with one another.

It is a further object of the present invention to provide a hydraulic system which can reduce overall expenses in production for an aircraft.

SUMMARY OF THE INVENTION

According to the first aspect of the present invention, there is provided a hydraulic system for retracting into and extending out of the body of an aircraft a landing gear for use in taking off and landing, comprising: a housing unit formed with a pressure imparting port to be connected with a fluid pressure reservoir and a pressure inlet/outlet port to be connected with an up-lock cylinder, a hydraulic pump accommodated in the housing unit to discharge therefrom and introduced therein a hydraulic fluid, a driving motor drivably connected with the hydraulic pump to impart rotation motion to the hydraulic pump, a hydraulic actuator accommodated in the housing unit and having a piston rod assembly received therein to be reciprocably moved by the hydraulic pump to assume two different positions consisting a retraction position where the piston rod assembly is positioned at its retracted position and locked by the up-lock cylinder and an extended position where the piston rod assembly is positioned at its extended position, a shuttle valve accommodated in the housing unit and positioned between the hydraulic pump and the hydraulic actuator and movable with respect to the housing unit to assume two different positions for selectively changing the flow of the hydraulic fluid between the hydraulic pump and the hydraulic actuator, an emergency valve accommodated in the housing unit and positioned between the hydraulic pump and the hydraulic actuator and between the pressure imparting port and the hydraulic actuator and movable with respect to the housing unit to assume two different positions for selectively changing the flow of the hydraulic fluid between the hydraulic pump and the hydraulic actuator and the flow of the hydraulic pump and the fluid pressure reservoir, an actuator pressure releasing mechanism accommodated in the housing unit to release the hydraulic pressure in the hydraulic actuator to allow the piston rod assembly to be freely moved with respect to the housing unit toward the extended position of the piston rod assembly, and a mechanically locking mechanism accommodated in the housing unit to lock the piston rod assembly with the housing unit when the hydraulic pump is not driven by the driving motor and to unlock the piston rod assembly from the housing unit to be freely moved when the hydraulic pump is driven by the driving motor.

According to the second aspect of the present invention, there is provided a hydraulic system for retracting into and extending out of the body of an aircraft a landing gear for use in taking off and landing, comprising: a housing unit formed with a pressure inlet/outlet port to be connected with an up-lock cylinder, a hydraulic pump accommodated in the housing unit to discharge therefrom and introduce therein a hydraulic fluid, a driving motor drivably connected with the hydraulic pump to impart rotation motion to the hydraulic pump, a hydraulic actuator accommodated in the housing unit and having a piston rod assembly received therein to define two pressure chambers, the piston rod assembly being reciprocably moved by the hydraulic pump to assume two different positions consisting a retraction position where the piston rod assembly is positioned at its retracted position and locked by the up-lock cylinder and an extended position where the piston rod assembly is positioned at its extended position, a shuttle valve accommodated in the housing unit and positioned between the hydraulic pump and the hydraulic actuator and movable with respect to the housing unit to assume two different positions for selectively changing the flow of the hydraulic fluid between the hydraulic pump and the hydraulic actuator, a dump valve accommodated in the housing unit and positioned between the hydraulic pump and the hydraulic actuator and movable with respect to the housing unit to assume two different positions consisting of a normal position where the hydraulic actuator is reciprocably moved by the hydraulic pump to assume the retraction position and the extended position, and an abnormal position where the hydraulic pressures of the hydraulic fluid in the pressure chambers of the hydraulic actuator become equal to have the piston rod assembly freely movable with respect to the housing unit toward the extended position of the piston rod assembly, an actuator pressure retaining mechanism accommodated in the housing unit to retain the hydraulic pressure in the hydraulic actuator, and a mechanically locking mechanism accommodated in the housing unit to lock the piston rod assembly with the housing unit when the hydraulic pump is not driven by the driving motor and to unlock the piston rod assembly from the housing unit to be freely moved when the hydraulic pump is driven by the driving motor.

According to the third aspect of the present invention, there is provided a hydraulic system for retracting into and extending out of the body of an aircraft a landing gear for use in taking off and landing, comprising: a housing unit formed with a pressure imparting port to have a hydraulic pressure of a hydraulic fluid pass therethrough and with a pressure inlet/outlet port to be connected with an up-lock cylinder to have a hydraulic pressure of a hydraulic fluid pass therethrough, a hydraulic pump accommodated in the housing unit to discharge therefrom and introduce therein a hydraulic fluid, a driving motor drivably connected with the hydraulic pump to impart rotation motion to the hydraulic pump, a hydraulic actuator accommodated in the housing unit and having a piston rod assembly received therein to be reciprocably moved by the hydraulic pump to assume two different positions consisting a retraction position where the piston rod assembly is positioned at its retracted position and locked by the up-lock cylinder and an extended position where the piston rod assembly is positioned at its extended position, a shuttle valve accommodated in the housing unit and positioned between the hydraulic pump and the hydraulic actuator and movable with respect to the housing unit to assume two different positions for selectively changing the flow of the hydraulic fluid between the hydraulic pump and the hydraulic actuator, an actuator pressure retaining mechanism accommodated in the housing unit to retain the hydraulic pressure in the hydraulic actuator, and a mechanically locking mechanism accommodated in the housing unit to lock the piston rod assembly with the housing unit when the hydraulic pump is not driven by the driving motor and to unlock the piston rod assembly from the housing unit to be freely moved when the hydraulic pump is driven by the driving motor.

BRIEF DESCRIPTION OF THE DRAWINGS

The features and advantages of a hydraulic system according to the present invention will be more clearly understood from the following description taken in conjunction with the accompanying drawings in which.

DESCRIPTION OF THE PREFERRED EMBODIMENTS

Figure 1:
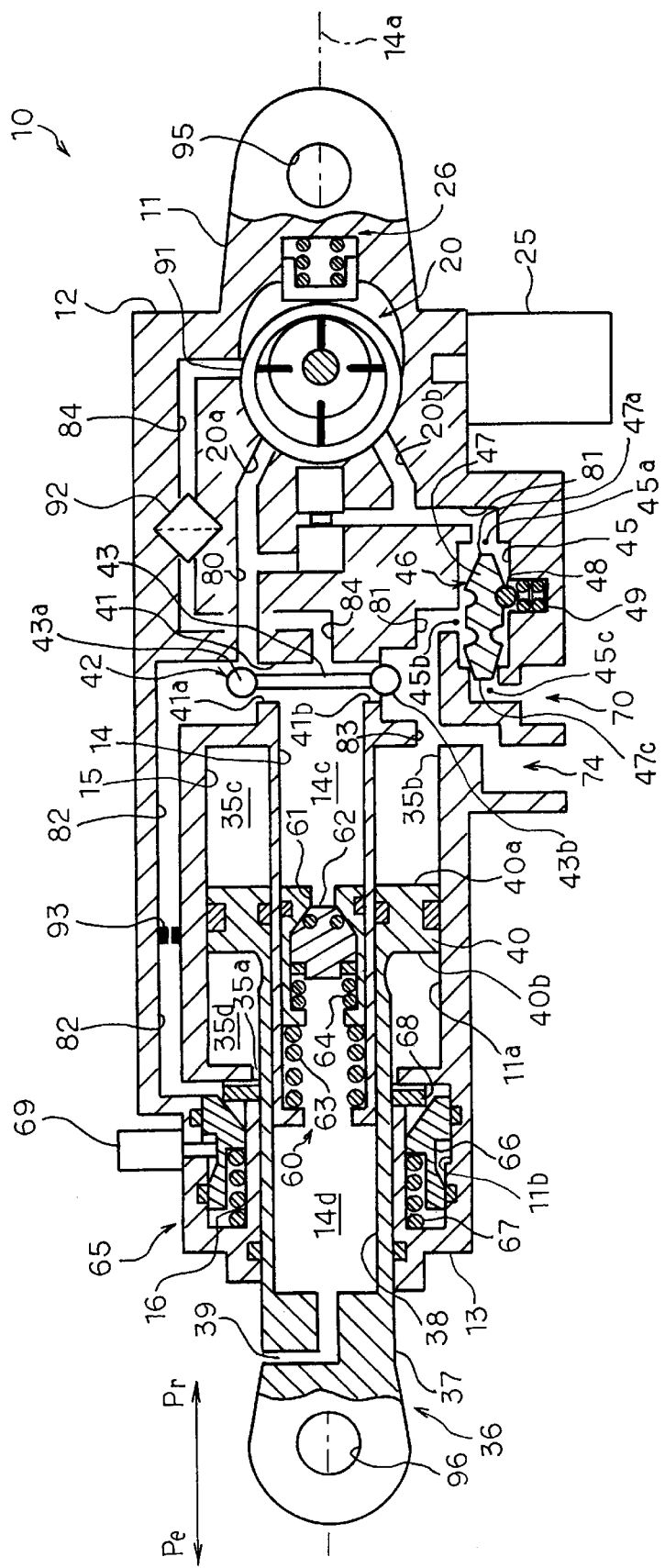
FIG. 1 is a longitudinal cross-sectional view showing a first preferred embodiment of the hydraulic system according to the present invention.

The first embodiment of the hydraulic system according to the present invention will be described hereinlater with reference to the drawings, particularly to FIGS. 1 and 2.

The first embodiment of the hydraulic system 10 comprises a housing unit 11. The housing unit 11 is formed with a large diameter cavity 11a having an opening end and a closing end, and a small diameter cavity 11b smaller in diameter than the large diameter cavity 11a and having an opening end connected with the opening end of the large diameter cavity 11a and a closing end.

The housing unit 11 has a first end wall portion 12 and a second end wall portion 13 and is formed with a central cavity 14 having a center axis 14a, an actuator cavity 15 surrounding the central cavity 14 and positioned in coaxial relationship with the central cavity 14. The housing unit 11 further has an annular guide portion 16 axially extending toward the first end wall portion 12 from the second end wall portion 13 along the center axis 14a of the central cavity 14. The first end wall portion 12 of the housing unit 11 has secured thereto a bracket being formed with an eye 95 used for connection with other parts of the aircraft not shown.

Figure 7A:
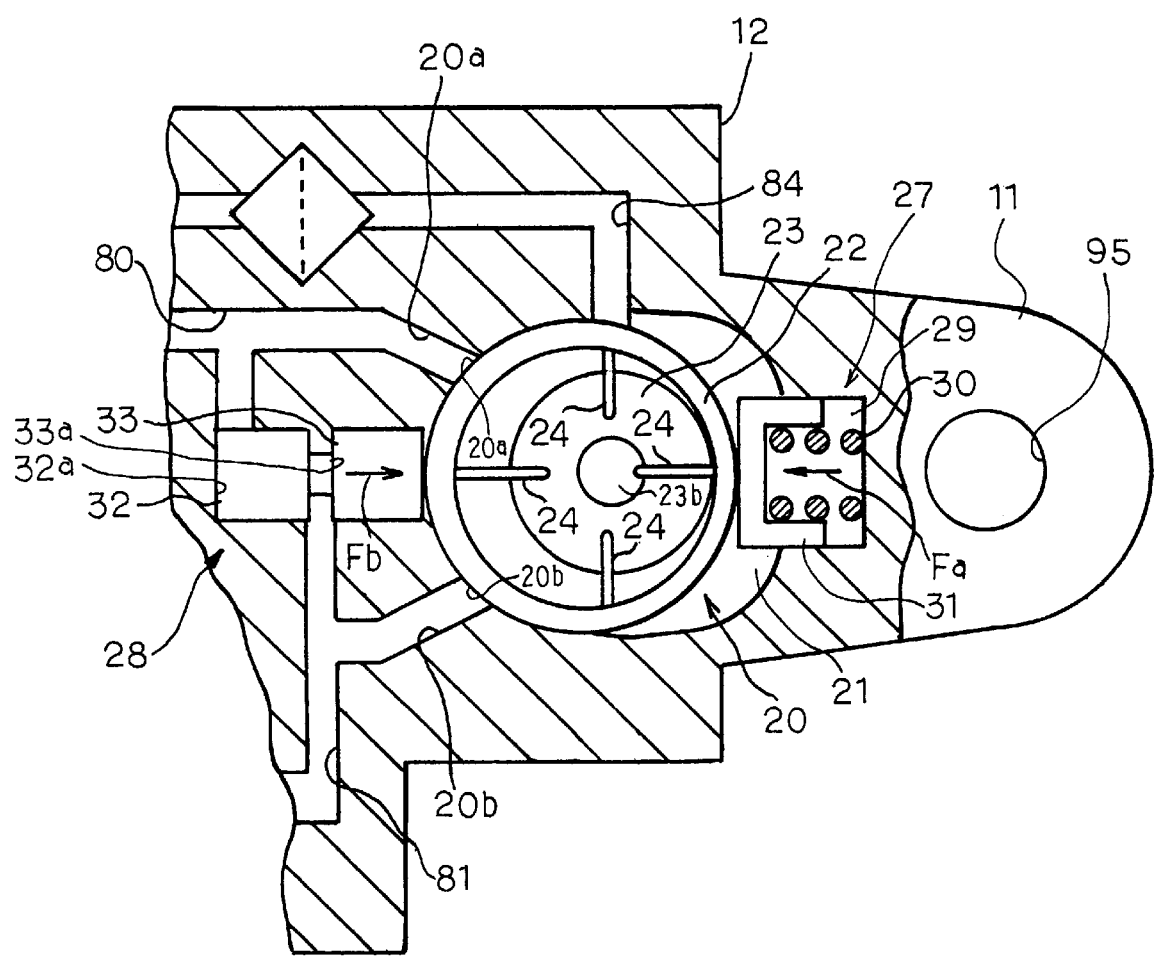
FIG. 7(A) is an enlarged fragmentary cross-sectional view of a hydraulic pump and a hydraulic pressure controller to be assembled into each of the first to third embodiments of the hydraulic system according to the present invention.
Figure 7B:
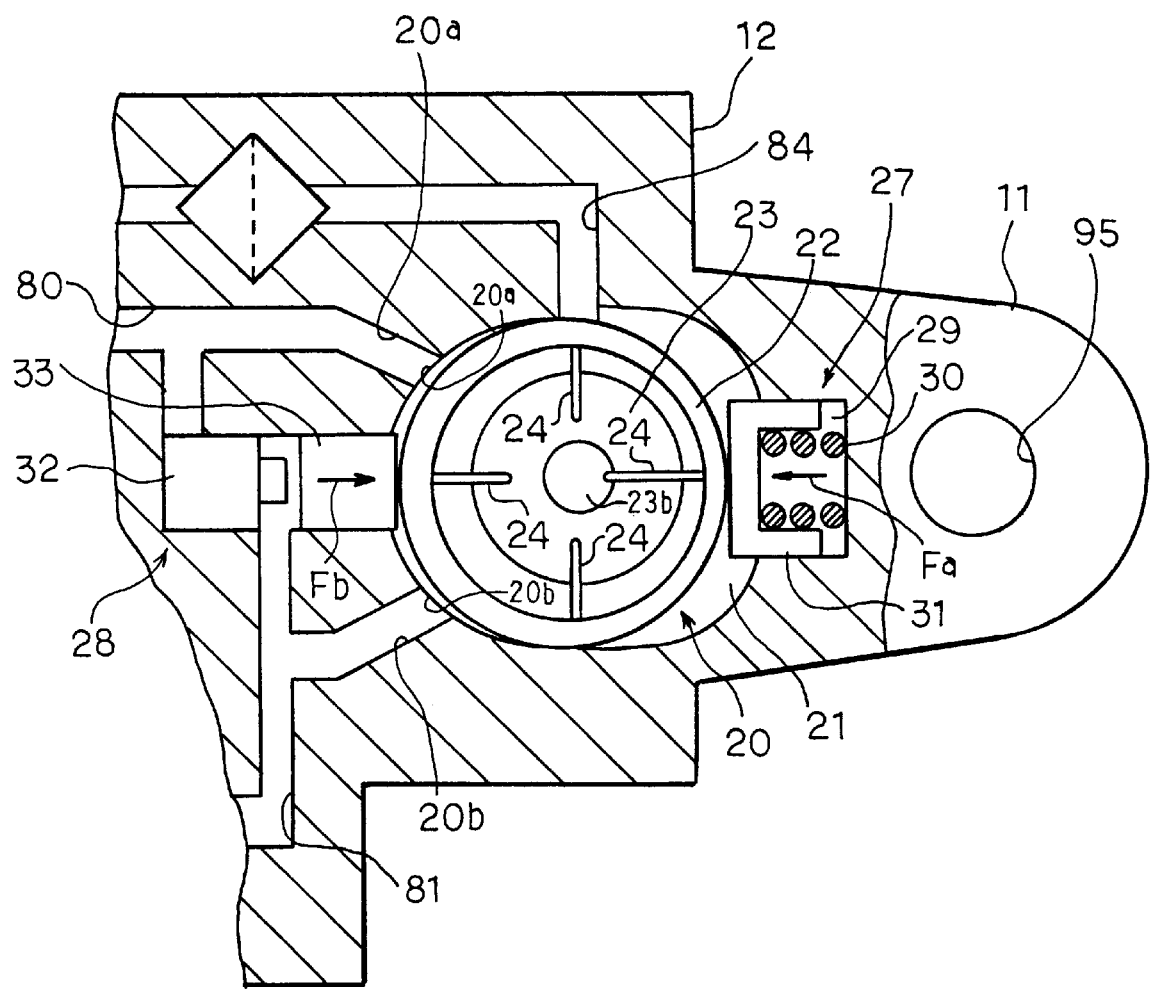
FIG. 7(B) is an enlarged fragmentary cross-sectional view similar to FIG. 7(A) but showing a ring member forming part of the hydraulic pump and moved by the hydraulic pressure controller from the position of the ring member shown in FIG. 7(A) in a direction having the amount of the hydraulic fluid from the hydraulic pump reduced.

The first embodiment of the hydraulic system 10 comprises a hydraulic pump 20. As best shown in FIGS. 7(A) and 7(B), the hydraulic pump 20 comprises a cavity 21 formed in the housing unit 11 in the neighborhood of the first end wall portion 12 of the housing unit 11 and a ring member 22 received in the cavity 21 and movably retained by the housing unit 11, the ring member 22 being formed with first and second inlet/outlet ports 20a, 20b and having a center axis, an eccentric member 23 received in the ring member 22 and having an eccentric shaft 23b rotatably supported by the housing unit 11 with an eccentric axis eccentric with respect to the center axis of the ring member 22, a plurality of vane members 24 equi-angularly positioned around the eccentric axis of the eccentric member 23 and radially outwardly extending to have their respective leading radial ends resiliently held in sliding contact with the inner surface of the ring member 22 by a compression coil spring not shown in the drawings.

It is therefore appreciated that the hydraulic fluid is introduced into the interior of the ring member 22 and discharged out of the interior of the ring member 22 under the influence of the vane members 24 radially retracted out of and extended into contact with the ring member 22 when the eccentric member 23 is rotated around the eccentric axis of the eccentric shaft 23b.

The first embodiment of the hydraulic system 10 further comprises a pressure controller 26 which comprises first biasing means 27 having a fixed constant spring force Fa, and second biasing means 28 positioned in radially opposing relationship to the first biasing means 27 and having a variable biasing force Fb to urge the ring member 22 of the hydraulic pump 20 in a direction having the center axis of the ring member 22 moved toward and away from the eccentric axis of the eccentric shaft 23b.

Referring to the FIGS. 7(A) and 7(B), the first biasing means 27 comprises a cylindrical recess 29 formed in the housing unit 11, a compression coil spring 30 received in the cylindrical recess 29, and a cap member 31 capping the leading end of the compression coil spring 30 in contact with the ring member 22 of the hydraulic pump 20 so that the ring member 22 is resiliently urged toward the second biasing means 28 by the compression coil spring 30.

The second biasing means 28 comprises first and second pistons 32 and 33 having respective pressure receiving faces 32a and 33a which allow the respective hydraulic pressures of the hydraulic fluid discharged from the first and second inlet/outlet ports 20a and 20b of the hydraulic pump 20 to receive thereon, and first and second piston rods coaxially arranged in the housing unit 11 to be moved toward and away from the eccentric member 23 of the hydraulic pump 20. This means that the ring member 22 can be moved toward and away from the first biasing means 27 by the hydraulic pressure of the hydraulic fluid from each of the first and second inlet/outlet ports 20a and 20b of the hydraulic pump 20 and the spring force Fa of the compression coil spring 30 of the first biasing means 27 to adjust the distance between the eccentric axis of the eccentric shaft 23b and the center axis of the ring member 22, i.e., the eccentricity of the eccentric axis to the center axis of the ring member 22 in response to the hydraulic pressures of the hydraulic fluid discharged from the first and second inlet/outlet ports 20a and 20b of the hydraulic pump 20. The adjustment of the eccentricity can make the amount of the hydraulic fluid discharged from each of the first and second inlet/outlet port 20a and 20b of the hydraulic pump 20 to be varied. This results in the fact that the hydraulic pressure of the hydraulic fluid discharged from the each of the first and second inlet/outlet ports 20a and 20b of the hydraulic pump 20 can be adjusted and compensated by the first and second biasing means 27 and 28.

It is to be understood that the hydraulic pressure controller 26 thus constructed in the above description can control the hydraulic pressure in the hydraulic fluid discharged from each of the first and second inlet/outlet ports 20a and 20b of the hydraulic pump 20 on the basis of the hydraulic pressures at the first and second inlet/outlet ports 20a and 20b of the hydraulic pump 20.

The first embodiment of the hydraulic system further comprises a driving motor 25 drivably connected with the eccentric shaft 23b of the hydraulic pump 20 to impart rotation motion to the eccentric shaft 23b of the hydraulic pump 20. The relationship between the hydraulic pump 20 and the driving motor 25 is schematically shown but not exactly shown in FIG. 1 in a way to have these parts connected with each other. The driving shaft of the driving motor 25 is assumed to be in drivable connection with the eccentric shaft 23b of the hydraulic pump 20.

The first embodiment of the hydraulic system 10 further comprises a hydraulic actuator 35 accommodated in the actuator cavity 15 of the housing unit 11. The hydraulic actuator 35 has a piston rod assembly 36 received therein to be reciprocably moved by the hydraulic pump 20 to assume two different positions consisting a retraction position Pr where the piston rod assembly 36 is positioned at its retracted position and locked by an up-lock cylinder 73 (see FIG. 2) and an extended position Pe where the piston rod assembly 36 is positioned at its extended position.

The piston rod assembly 36 comprises a piston rod 37 formed with a central cavity 38 having a center axis in coaxial relationship with the axis 14a of the central cavity 14 of the housing unit 11 and axially movably received in the annular guide portion 16 of the housing unit 11, an orifice 39 having one end connected to the central cavity 38 of the piston rod 37 and the other end open to exterior ambient air, a piston 40 integrally formed with the piston rod 37 and axially movably received in the hydraulic actuator 35 of the housing unit 11 to form first and second pressure chambers 35c and 35d and having first and second axial end faces 40a and 40b to receive the hydraulic pressure of the hydraulic fluid thereon. The piston rod 37 of the piston rod assembly 36 is formed with an eye 96 used for connection with other parts of the aircraft not shown.

The housing unit 11 is further formed with a through bore 41, first and second openings 41a and 41b positioned at the both longitudinal ends of the through bore 41. The first embodiment of the hydraulic system 10 further comprises a shuttle valve 42 which comprises a rod portion 43 slidably received in the through bore 41, and first and second ball portions 43a and 43b securely connected with the both longitudinal ends of the rod portion 43. The rod portion 43 of the shuttle valve 42 has a suitable length so as to enable the first and second openings 41a and 41b to be selectively closed and open by the first and second ball portions 43a and 43b, respectively, when each of the first and second ball portions 43a and 43b is subjected to the hydraulic pressure of the hydraulic fluid to have the rod portion 43 moved axially with respect to the housing unit 11.

It is thus to be understood that the shuttle valve 42 is accommodated in the housing unit 11 and positioned between the hydraulic pump 20 and the hydraulic actuator 35 and movable with respect to the housing unit 11 to assume two different positions for selectively changing the flow of the hydraulic fluid between the hydraulic pump 20 and the hydraulic actuator 35.

The housing unit 11 is further formed with a side cavity 45 open at first, second and third ports 45a, 45b and 45c. The first port 45a is held in communication with the second inlet/outlet port 20b of the hydraulic pump 20. The second port 45b is held in communication with the second opening 41b of the shuttle valve 42, the first pressure chamber 35c of the hydraulic actuator 35 and a pressure inlet/outlet port 74 which will be apparent as the description proceeds. The third port 45c is held in communication with a pressure imparting port 70 which will also be apparent as the description proceeds.

The first embodiment of the hydraulic system further comprises an emergency valve 46. The emergency valve 46 comprises a valve body 47 axially movably received in the side cavity 45, having two annular grooves formed on the peripheral portion thereof and axially spaced apart from each other, and a pair of pressure receiving faces 47a and 47c at its axially outer ends to allow the hydraulic pressure of the hydraulic fluid to be received thereon, and a spherical member 48 received in one of the annular grooves. The housing unit 11 is further formed with an annular recess 49 in the vicinity of the valve body 47 of the emergency valve 46 and having a center axis in perpendicular relationship with the center axis of the valve body 47 of the emergency valve 46. The annular recess 49 receives a compression coil spring therein to resiliently urge the spherical member 48 on the valve body 47 of the emergency valve 46 toward the center axis of the valve body 47 of the emergency valve 46. The valve body 47 of the emergency valve 46 is axially movable with respect to the housing unit 11 when any one of the pressure receiving faces 47a and 47c is subjected to the hydraulic pressure of the hydraulic fluid introduced into the side cavity 45 through the first and third ports 45a and 45c of the side cavity 45 of the housing unit 11. The valve body 47 of the emergency valve 46 can assume two different positions consisting a first axial position where the spherical member 48 is engaged with one of the annular groove to allow the hydraulic fluid to pass from the second inlet/outlet port 20b of the hydraulic pump 20 to the shuttle valve 42 through the first port 45a of the side cavity 45 and vice versa, and a second axial position where the spherical member 48 is engaged with the other of the annular groove to allow the hydraulic fluid to be introduced into the side cavity 45 through the pressure imparting port 70 and the third port 45c of the side cavity 45.

It is thus to be understood that the emergency valve 46 is accommodated in the housing unit 11 and positioned between the hydraulic pump 20 and the hydraulic actuator 35 and between the pressure imparting port 70 and the hydraulic actuator 35 and movable with respect to the housing unit 11 to assume two different positions for selectively changing the flow of the hydraulic fluid between the hydraulic pump 20 and the hydraulic actuator 35 and the flow of the hydraulic pump 20 and the pressure imparting port 70.

The first embodiment of the hydraulic system 10 further comprises a pressure releasing mechanism 60.

The pressure releasing mechanism 60 is accommodated in the central cavity 14 of the housing unit 11 and comprises a ring member 61 axially slidably received in the central cavity 14, a valve member 62 axially slidably received in the ring member 61 to have a pressure chamber 14c and a non-pressure chamber 14d separated therebetween, the pressure chamber 14c being held in communication with the through bore 41 of the shuttle valve 42 and the non-pressure chamber 14d being held in communication with exterior ambient air through the central cavity 38 of the piston rod 37 of the piston rod assembly 36 and the orifice 39 of the piston rod 37 of the piston rod assembly 36, a first compression coil spring 63 received in the non-pressure chamber 14d of the central cavity 14 to axially urge the ring member 61 toward the shuttle valve 42 against the hydraulic pressure of the hydraulic fluid in the pressure chamber 14c of the central cavity 14, and a second compression coil spring 64 received in the ring member 61 to axially urge the valve member 62 toward the shuttle valve 42 against the hydraulic pressure of the hydraulic fluid in the pressure chamber 14c of the central cavity 14. The above construction of the pressure releasing mechanism 60 leads to the fact that the valve member 62 can close and open communication between the pressure chamber 14c and non-pressure chamber 14d of the central cavity 14.

The first embodiment of the hydraulic system 10 further comprises a mechanically locking mechanism 65 accommodated in the annular guide portion 16 of the housing unit 11.

The mechanically locking mechanism 65 comprises a ring member 66 slidably received in the small diameter cavity 11b and positioned around the annular guide portion 16 and formed with a pressure receiving face to receive the hydraulic pressure of the hydraulic fluid thereon. The pressure receiving face of the ring member 66 has a radially inner inclined face portion inclined with respect to the center axis 14a of the central cavity 14 of the housing unit 11. The ring member 66 has a radially outer face portion substantially perpendicular to the center axis 14a of the central cavity 14 of the housing unit 11, a radially inner portion formed with an annular inner groove, a radially outer portion formed with an annular outer groove, and a compression coil spring 67 received in the annular inner groove and on the annular guide portion 16 of the housing unit 11 to resiliently urge the ring member 66 toward the large diameter cavity 11a against the hydraulic pressure of the hydraulic fluid received on the pressure receiving face of the ring member 66.

The annular guide portion 16 of the housing unit 11 has an end portion axially spaced apart from the second end wall portion 13 of the housing unit 11 and formed with a first group of radial through bores not shown in the drawings and circumferentially equally formed to allow the hydraulic fluid to pass therethrough to and from the second pressure chamber 35d of the hydraulic actuator 35, and a second group of radial through bores also not shown in the drawings and circumferentially equally formed and each of which is disposed between the two neighboring radial through bores of the first group. The end portion of the annular guide portion 16 further comprises a plurality of locking members 68 each radially movably received in each of the second group of the radial through bores to be engageable with the radially outer face of the piston rod 37 of the piston rod assembly 36.

This means that each of the locking members 68 can assume a first radial position where each of the locking members 68 is held in frictional contact with the radially outer face of the piston rod 37 of the piston rod assembly 36 to lock the piston rod 36 with the housing unit 11 when the ring member 66 is resiliently urged and axially moved toward the large cavity 11a of the housing unit 11 by the compression coil spring 67 against the hydraulic pressure of the hydraulic fluid received on the pressure receiving face of the ring member 66, and a second radial position where each of the locking members 68 is released and held out of frictional contact with the radially outer face of the piston rod 37 of the piston rod assembly 36 to unlock the piston rod 37 from the housing unit 11 when the ring member 66 is urged and axially moved away from the large cavity 11a of the housing unit 11 toward the second end wall portion 13 of the housing unit 11 by the hydraulic pressure of the hydraulic fluid received on the pressure receiving face of the ring member 66 against the compression coil spring 67. The mechanically locking mechanism 65 further comprises a position sensor 69 for sensing the axial position of the ring member 66 to output a signal when the ring member 66 is urged and axially moved away from the large cavity 11a of the housing unit 11 toward the second end wall portion 13 of the housing unit 11. The outputted signal is transmitted to an lump, not shown in the drawings, which is turned on to inform a pilot of the state of the mechanically locking mechanism 65.

It is thus to be noted that the mechanically locking mechanism 65 can lock the piston rod 37 with the housing unit 11 when the hydraulic pump 20 is not driven by the driving motor 25 and can unlock the piston rod 37 from the housing unit 11 to be freely moved when the hydraulic pump 20 is driven by the driving motor 25.

The housing unit 11 is further formed with the pressure imparting port 70 held in communication with the side cavity 45 of the emergency valve 46. The pressure imparting port 70 is in turn to be held in communication with the pressure chamber of a fluid pressure reservoir 71 through an electromagnetic change valve 72 as will be seen in FIG. 2. The electromagnetic change valve 72 is of two-position change-over valve type so that when the hydraulic pump 20 or the driving motor 25 comes to be out of order, the electromagnetic change valve 72 is pushed down in FIG. 2 to cause the high pressure fluid of the pressure chamber of the fluid pressure reservoir 71 to be introduced into the side cavity 45 of the housing unit 11 through the pressure imparting port 70. FIG. 2 shows three hydraulic systems 10 and three up-lock cylinders 73 respectively operatively connected with the hydraulic systems 10. Each of the up-lock cylinders 73 has a pressure chamber held in communication with the pressure inlet-outlet port 74 formed in the housing unit 11 in the vicinity of the pressure imparting port 70 of the housing unit 11 as particularly shown in FIG. 1. This means that the pressure chamber of the up-lock cylinder 73 is held in communication with the first pressure chamber 35c of the hydraulic actuator 35 and the through bore 41 of the shuttle valve 42. The pressure chamber of the up-lock cylinder 73 is usually held in communication with the first pressure chamber 35c of the hydraulic actuator 35 to be subjected to the hydraulic pressure same as the hydraulic pressure in the first pressure chamber 35c of the hydraulic actuator 35. When the hydraulic pump 20 or the driving motor 25 becomes damaged, the electromagnetic change valve 72 is pushed downward in FIG. 2 to have the pressure chamber of the up-lock cylinder 73 brought into communication with the fluid pressure reservoir 71 through the pressure inlet/outlet port 74 and the pressure imparting port 70 of the housing unit 11. At this time, the valve body 47 of the emergency valve 46 is axially moved toward the first end wall portion 12 of the housing unit 11 to have the emergency 46 valve brought into communication with the fluid pressure reservoir 71 and to have the up-lock cylinder 73 at its unlocked state.

The housing unit has first, second, third and fourth fluid passageways 80, 81, 82 and 83.

The first fluid passageway 80 is connected at its one end to the first inlet/outlet port 20a of the hydraulic pump 20 and at its other end to the first opening 41a of the shuttle valve 42. The second fluid passageway 81 is connected at its one end to the second inlet/outlet port 20b of the hydraulic pump 20 and at its other end to the second opening 41b of the shuttle valve 42. The first and second fluid passageways 80 and 81 are respectively connected at their halfway with the first and second pistons 32 and 33 of the second biasing means 28 to have the first and second pistons 32 and 33 subjected to the hydraulic pressure of hydraulic fluid passing through the first and second fluid passageways 80 and 81.

The second fluid passageway 81 is also connected at its halfway with the side cavity 45 having the valve body 47 of the emergency valve 46 received therein to impart the hydraulic pressure of the hydraulic fluid on the first pressure receiving face 47a of the valve body 47 of the emergency valve 46.

The third fluid passageway 82 is connected at its one end to the first opening 41a of the shuttle valve 42 and at its other end to the small diameter cavity 11b of the housing unit 11. The third fluid passageway 82 has a restricting member 93 which is designed to have the hydraulic fluid to restrictively pass therethrough so that the amount of the hydraulic fluid is limited at a certain level when the hydraulic fluid passes the restricting member 93.

The fourth fluid passageway 83 is connected at its one end to the second opening 41b of the shuttle valve 42 and at its other end to the first pressure chamber 35c of the hydraulic actuator 35. The fourth fluid passageway 83 is connected at its halfway with the pressure inlet-outlet port 74 of the housing unit 11 to be held in communication with the up-lock cylinder 73.

The housing unit 11 further has fifth fluid passageway 84 having one end connected to a drain port 91 of the hydraulic pump 20 and the other end connected to the through bore 41 of the shuttle valve 42. The fifth passageway 84 is provided at its halfway with a drain filter 92 which serves to filtrate the hydraulic fluid drained from the through bore 41 of the shuttle valve 42.

The operation of the first embodiment of the hydraulic system 10 for retracting into and extending out of the body of an aircraft a landing gear for use in taking off and landing will be described hereinlater with reference to FIGS. 1 and 2.

It is assumed, in the following description, that the hydraulic fluid is introduced into the interior of the hydraulic pump 20 through the second inlet/outlet port 20b and discharged out of the hydraulic pump 20 through the first inlet/outlet port 20a when the hydraulic pump 20 is rotated clockwise in FIG. 1 by the driving motor 25. Under these conditions, the second inlet/outlet port 20b serves as an inlet port of the hydraulic fluid while the first inlet/outlet port 20a serves as an outlet port of the hydraulic fluid.

On the other hand, it is assumed, in the following description, that the hydraulic fluid is introduced into the interior of the hydraulic pump 20 through the first inlet/outlet port 20a and discharged out of the hydraulic pump 20 through the second inlet/outlet port 20b when the hydraulic pump 20 is rotated anti-clockwise in FIG. 1 by the driving motor 25. Under these conditions, the first inlet/outlet port 20a serves as an inlet port of the hydraulic fluid while the second inlet/outlet port 20b serves as an outlet port of the hydraulic fluid.

Firstly, the driving motor is driven to rotate the hydraulic pump anti-clockwise in FIG. 1, under the condition that all of the cavities and the passageways of the housing unit 11 are filled with the hydraulic fluid. It is to be understood, in this case, from the foregoing assumption, that the first inlet/outlet port 20a serves as an inlet port and the second inlet/outlet port 20b serves as an outlet port, therefore, the hydraulic fluid is discharged from the second inlet/outlet port 20b and is fed through the second fluid passageway 81 to supply high pressure to the second opening 41b of the through bore 41 of the shuttle valve 42. The high hydraulic pressure supplied to the second opening 41b of the shuttle valve 42 pushes the second ball portion 43b of the shuttle valve 42 to close the second opening 41b of the through bore 41 with the second ball portion 43b of the shuttle valve 42 and to open the first opening 41a as shown in FIG. 1. The hydraulic fluid fed through the second fluid passageway 81 is introduced into the side cavity 45 with the receiving face 47a of the valve body 47 subjected to the hydraulic pressure of the hydraulic fluid thus introduced.

The hydraulic fluid fed to the second opening 41b of the shuttle valve 42 is then fed through the fourth fluid passageway 83 and is introduced into the first pressure chamber 35c through the second port 35b of the hydraulic actuator 35. This means that the hydraulic pressure of the hydraulic fluid in the first pressure chamber 35c becomes higher than the hydraulic pressure of the hydraulic fluid in the second pressure chamber 35d. When the hydraulic pressure of the hydraulic fluid in the first pressure chamber 35c becomes higher than the hydraulic pressure of the hydraulic fluid in the second pressure chamber 35d, the piston 40 of the piston rod assembly 36 is urged and moved toward the second end wall portion 13 of the housing unit 11 to increase the hydraulic pressure of the second pressure chamber 35d.

The hydraulic fluid in the second pressure chamber 35d then acts to supply the increased hydraulic pressure to the pressure receiving face of the ring member 66 of the mechanically locking mechanism 65 via the opening port 35a of the hydraulic actuator 35 and the first group of the radial through bores of the annular guide portion 16. The ring member 66 around the annular guide portion 16 is axially moved toward the second end wall portion 13 by the increased hydraulic pressure of the hydraulic fluid against the compression coil spring 67.

Under these conditions, each of the locking members 68 assumes the second radial position where the locking members 68 is released and held out of frictional contact with the radially outer face of the piston rod 37 of the piston rod assembly 36 to unlock the piston rod 37 from the housing unit 11.

The piston rod 37 of the piston rod assembly 36 is, consequently, moved toward the second end wall portion 13 by the hydraulic pressure of the first pressure chamber 35c to assume the extended position (Pe).

The hydraulic fluid is then fed through the third fluid passageway 82 to the first opening 41a of the shuttle valve 42 via the restricting member 93 and subsequently fed through the first fluid passageway 80 to the hydraulic pump 20 via the first inlet/outlet port 20a. The hydraulic fluid introduced to the first opening 41a of the shuttle valve 42 passes through the first opening 41a of the shuttle valve 42 remaining open. The hydraulic fluid passed through the first opening 41a of the shuttle valve 42 is then fed through the fifth fluid passageway 84 to the drain port 91 of the hydraulic pump 20 via the drain filter 92 and simultaneously is introduced into the pressure chamber 14c of the central cavity 14. When the hydraulic pressure of the hydraulic fluid of the pressure chamber 14c to the valve member 62 of the pressure releasing mechanism 60 is higher than the force of the second compression coil spring 64 to the valve member 62, the valve member 62 is moved by the hydraulic pressure of the hydraulic fluid of the pressure chamber 14c toward the second end wall portion 13 to open the communication between the pressure chamber 14c and the non-pressure chamber 14d. By the reason that the non-pressure chamber 14d of the central cavity 14 is open to exterior ambient air via the orifice 39, the high hydraulic pressure in the pressure chamber 14c of the central cavity 14 is released through the non-pressure chamber 14d of the central cavity 14.

During the aforementioned process, the hydraulic fluid discharged from the second inlet/outlet port 20b is also fed to the second piston 33 of the second biasing means 28 to supply hydraulic pressure of the hydraulic fluid to the pressure receiving face 33a of the second piston 33. The hydraulic pressure of the hydraulic fluid to the second piston 33 of the second biasing means 28 acts to urge the ring member 22 toward the first biasing means 27 against the compression coil spring 30 of the first biasing means 27.

Referring to the FIGS. 7(A) and 7(B), the hydraulic pressure of the hydraulic fluid imparted on the pressure receiving face 33a of the second piston 33 as shown by an arrow "Fb" is supplied to the ring member 22 of the hydraulic pump 20. When the hydraulic pressure "Fb" of the hydraulic fluid is larger than the spring force of the compression coil spring 30 of the first biasing means, the ring member 22 is moved from the position shown in FIG. 7(A) to the position shown in FIG. 7(B) by the force Fb to reduce the eccentricity of the eccentric axis of the eccentric shaft 23 to the center axis of the ring member 22. When the hydraulic pressure "Fb" of the hydraulic fluid is inversely smaller than the spring force of the compression coil spring 30 of the first biasing means 27 under these conditions, the ring member 22 is moved from the position shown in FIG. 7(B) to the position shown in FIG. 7(A) by the force of the compression coil spring 30 shown by an arrow "Fa" to increase the eccentricity of the eccentric axis of the eccentric shaft 23 to the center axis of the ring member 22. The reduction and increase of the eccentricity of the eccentric axis of the eccentric shaft 23 to the center axis of the ring member 22 results in the change of the pressure of the hydraulic fluid discharged from the first inlet/outlet ports 20a of the hydraulic pump 20. This leads to the fact that the hydraulic pressure of the hydraulic fluid discharged from the first inlet/outlet ports 20a of the hydraulic pump 20 is adjusted and compensated by the first and second biasing means 27 and 28.

On the other hand, the driving motor 25 is in turn driven to rotate the hydraulic pump 20 clockwise in FIG. 1, under the condition that all of the cavities and the passageways of the housing unit 11 are filled with the hydraulic fluid. It is to be understood, in this case, from the foregoing assumption, that the second inlet/outlet port 20b serves as an inlet port while the first inlet/outlet port 20a serves as an outlet port, therefore, the hydraulic fluid is discharged from the first inlet/outlet port 20a and is fed through the first fluid passageway 80 to supply high hydraulic pressure to the first opening 41a of the through bore 41 of the shuttle valve 42. The high hydraulic pressure supplied to the first opening 41a of the shuttle valve 42 acts to urge the first ball portion 43a of the shuttle valve 42 toward the second opening 41b of the shuttle valve 42 to close the first opening 41a of the through bore 41 with the first ball portion 43a of the shuttle valve 42 and to open the second opening 41b of the through bore 41.

The hydraulic fluid is then fed through the third fluid passageway 82 to supply high hydraulic pressure to the pressure receiving face of the ring member 66 of the mechanically locking mechanism 65 via the restricting member 93. The ring member 66 is axially moved toward the second end wall portion 13 of the housing unit 11 by the high hydraulic pressure of the hydraulic fluid against the compression coil spring 67. Under these conditions, each of the locking members 68 assumes the second radial position where the locking members 68 is released and held out of frictional contact with the radially outer face of the piston rod 37 of the piston rod assembly 36 to unlock the piston rod 37 from the housing unit 11.

At the same time, the hydraulic fluid is introduced into the second pressure chamber 35d of the hydraulic actuator 35 through the first group of the radial through bores of the annular guide portion 16 to supply high pressure to the second axial end surface 40b of the piston 40 of the piston rod assembly 37. This means that the hydraulic pressure of the hydraulic fluid in the second pressure chamber 35d of the hydraulic actuator 35 becomes higher than the hydraulic pressure of the hydraulic fluid in the first pressure chamber 35c of the hydraulic actuator 35. The piston rod 37 of the piston rod assembly 36 is, consequently, moved away from the second end wall portion 13 by the high hydraulic pressure of the second pressure chamber 35d of the hydraulic actuator 35 to assume the retraction position (Pr) of the piston rod assembly 36.

In accordance with the movement of the piston rod 37 of the piston rod assembly 36, the hydraulic fluid in the first pressure chamber 35c of the hydraulic actuator 35 is discharged out through the second port 35b of the hydraulic actuator 35 to supply high pressure to the pressure chamber of the up-lock cylinder 73 through the pressure inlet/outlet port 74.

At the same time, the hydraulic fluid discharged out of the first pressure chamber 35c of the hydraulic actuator 35 is then fed through the fourth fluid passageway 83 to the second opening 41b of the shuttle valve 42 and is then fed through the second fluid passageway 81 to the hydraulic pump 20 via the side cavity 45 and second inlet/outlet port 20b of the hydraulic pump 20.

The hydraulic fluid fed to the second opening 41b of the shuttle valve 42 passes through the second opening 41b of the shuttle valve 42. The hydraulic fluid passed through the second opening 41b of the shuttle valve 42 is then fed through the fifth fluid passageway 84 to the drain port 91 of the hydraulic pump 20 via the drain filter 92 and simultaneously is introduced into the pressure chamber 14c of the central cavity 14. When the hydraulic pressure of the hydraulic fluid of the pressure chamber 14c of the central cavity 14 to the valve member 62 of the pressure releasing mechanism 60 is higher than the force of the second compression coil spring 64 to the valve member 62, the valve member 62 is moved by the hydraulic pressure of the hydraulic fluid of the pressure chamber 14c toward the second end wall portion 13 to open the communication between the pressure chamber 14c of the central cavity 14 and the non-pressure chamber 14d of the central cavity 14. By the reason that the non-pressure chamber 14d of the central cavity 14 is open to exterior ambient air via the orifice 39, the high hydraulic pressure in the pressure chamber 14c of the central cavity 14 is released through the non-pressure chamber 14d of the central cavity 14.

During the aforementioned process, the hydraulic fluid discharged from the first inlet/outlet port 20a is similarly fed to the first piston 32 of the second biasing means 28 to supply hydraulic pressure of the hydraulic fluid to the pressure receiving face 32a of the first piston 32. The hydraulic pressure of the hydraulic fluid to the first piston 32 of the second biasing means 28 acts to urge the ring member 22 toward the first biasing means 27 against the compression coil spring 30 of the first biasing means 27.

As a result, the hydraulic pressure of the hydraulic fluid discharged from the first inlet/outlet ports 20a of the hydraulic pump 20 is adjusted and compensated by the first and second biasing means 27 and 28.

Figure 2:
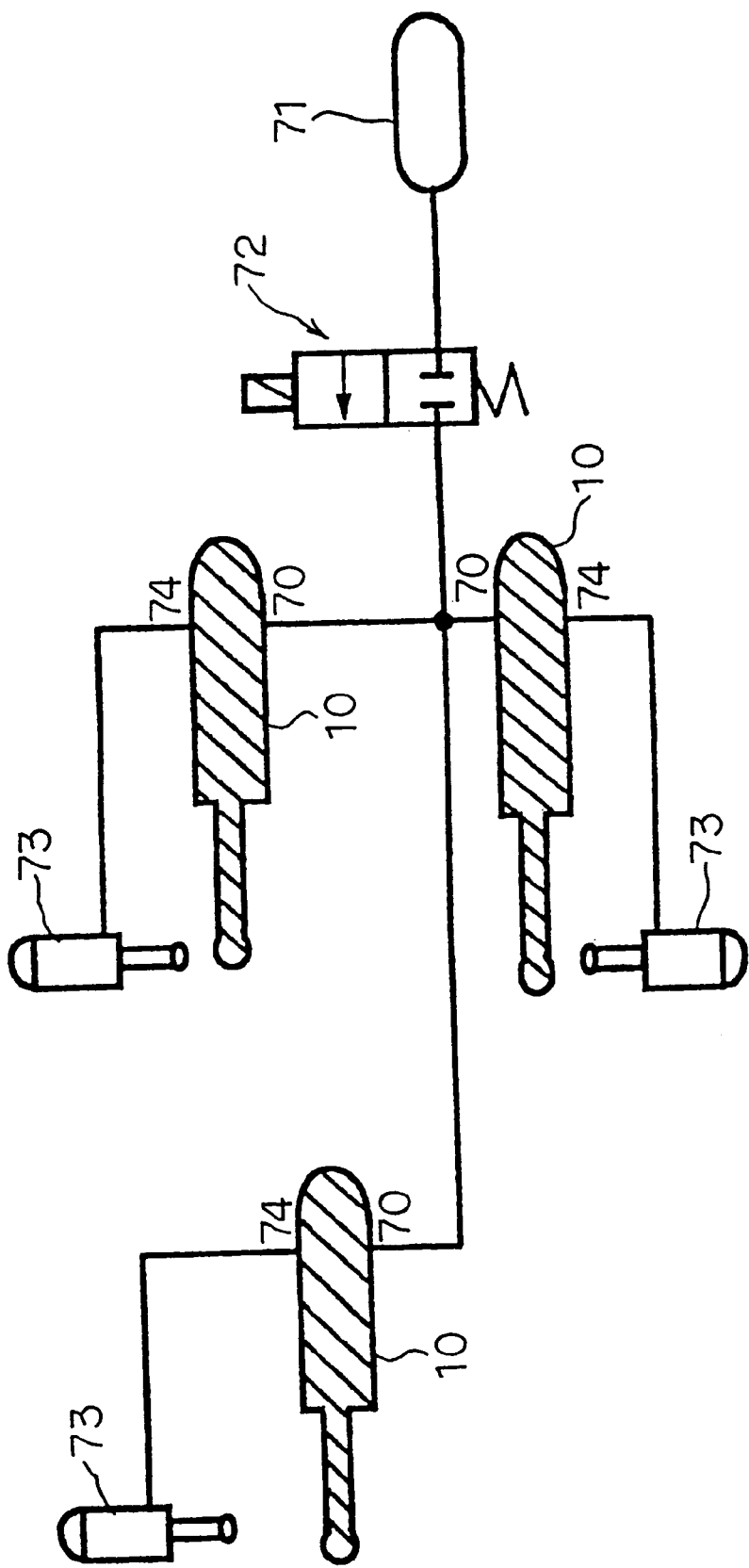
FIG. 2 is a schematic view showing an arrangement of the hydraulic system in association with three up-lock cylinders assembled to an aircraft.

When the hydraulic pump 20 or the driving motor 25 becomes out of order, the electro-magnetic change valve 72 is pushed down in FIG. 2 to cause the high pressure fluid of the pressure chamber of the fluid pressure reservoir 71 to be introduced to the third port 45c of the side cavity 45 through the pressure imparting port 70. The high pressure fluid introduced to the pressure imparting port 70 of the side cavity 45 is imparted to the pressure receiving face of the valve body 47 of the emergency valve 46 to urge the valve body 47 of the emergency valve 46 toward the first end wall portion 12 of the housing unit 11 against the compression coil spring 49. When the pressure receiving face of the valve body 47 of the emergency valve 46 exceeds the spring force of the compression coil spring 49, the valve body 47 is axially moved toward the first end wall portion 12 of the housing unit 11 to have the spherical member engaged with the annular groove nearer to the first end wall portion 12 of the housing unit 11.

Under these conditions, the third port 45c of the side cavity 45 is opened while the first port 45a of the side cavity 45 is closed by the valve body 47 of the emergency valve 46. The hydraulic fluid is then introduced into the side cavity and fed to the second opening 41b of the through bore 41 through the second fluid passageway 81. The hydraulic fluid is successively fed through the chambers 35c and 35d and passageways 83 and 82 in the same way as descried above in the case when the second inlet/outlet port 20b serves as an outlet port to the first opening port 41a of the through bore 41. The axial movement of the valve body of the emergency valve ensures the piston rod 37 of the piston rod assembly 36 to assume the extended position (Pe).

The hydraulic fluid fed to the first opening 41a of the through bore 41 then passes through the first opening 41a to be fed into the pressure chamber 14c of the central cavity 14. The hydraulic fluid in the pressure chamber 14c of the central cavity 14 supplies high hydraulic pressure to the valve member 62 of the pressure releasing mechanism 60 against the force of the second compression coil spring 64 to the valve member 62 to move the valve member 62 toward the second end wall portion 13 for opening the communication between the pressure chamber 14c and the non-pressure chamber 14d. The non-pressure chamber 14d is thus open to exterior ambient air via the orifice 39, and the high hydraulic pressure in the pressure chamber 14c is released from the pressure chamber 14c of the central cavity 14 even though the hydraulic pump 20 or the driving motor does not work and hydraulic fluid is not fed through the fifth fluid passageway 84 to the drain port 91 of the hydraulic pump 20.

When, on the other hand, the hydraulic pump 20 or the driving motor 25 is returned to its normal operation, the electromagnetic change valve 72 is held at its position shown in FIG. 2. Under these conditions, the valve body 47 of the emergency valve 46 is returned to its original position shown in FIG. 1 by appropriate means not shown in the drawings.

The second embodiment of the hydraulic system according to the present invention will be described hereinlater with reference to the drawings, particularly to FIGS. 3, 4 and 8.

The second embodiment of the hydraulic system 110 comprises a housing unit 111. The housing unit 111 is formed with a large diameter cavity 111a having an opening end and a closing end, and a small diameter cavity 111b smaller in diameter than the large diameter cavity 111a and having an opening end connected with the opening end of the large diameter cavity 11a and a closing end.

The housing unit 111 has a first end wall portion 112 and a second end wall portion 113 and is formed with a central cavity 114 having a center axis 114a, an actuator cavity 115 surrounding the central cavity 114 and positioned in coaxial relationship with the central cavity 114. The housing unit 111 further has an annular guide portion 116 axially extending toward the first end wall portion 112 from the second end wall portion 113 along the center axis 114a of the central cavity 114. The first end wall portion 112 of the housing unit 111 has secured thereto a bracket being formed with an eye 195 used for connection with other parts of the aircraft not shown.

The second embodiment of the hydraulic system 110 comprises a hydraulic pump 120. The second embodiment of the hydraulic system 110 further comprises a hydraulic pump 120 accommodated in the housing unit to discharge therefrom and introduce therein a hydraulic fluid.

The hydraulic pump 120 comprises a cavity 121 formed in the housing unit 111 in the neighborhood of the first end wall portion 112 of the housing unit 111 and a ring member 122 received in the cavity 121 and movably retained by the housing unit 111, the ring member 122 being formed with first and second inlet/outlet ports 120a, 120b and having a center axis, an eccentric member 123 received in the ring member 122 and having an eccentric shaft 123b rotatably supported by the housing unit 111 with an eccentric axis eccentric with respect to the center axis of the ring member 122, a plurality of vane members 124 equi-angularly positioned around the eccentric axis of the eccentric member 123 and radially outwardly extending to have their respective leading radial ends resiliently held in sliding contact with the inner surface of the ring member 122 by a compression coil spring not shown in the drawings.

It is therefore appreciated that the hydraulic fluid is introduced into the interior of the ring member 122 and discharged out of the interior of the ring member 122 under the influence of the vane members 124 radially retracted out of and extended into contact with the ring member 122 when the eccentric member 123 is rotated around the eccentric axis of the eccentric shaft 123b.

The second embodiment of the hydraulic system 110 further comprises a pressure controller 126 which is substantially identical to the pressure controller 26 of the first embodiment of the hydraulic system according to the present invention shown in FIGS. 1, 7(A) and 7(B) so that the elements or parts of the pressure controller 126 of the second embodiment of the hydraulic system 110 will not be described hereinafter.

The second embodiment of the hydraulic system further comprises a driving motor 125 drivably connected with the eccentric shaft 123b of the hydraulic pump 120 to impart rotation motion to the eccentric shaft 123b of the hydraulic pump 120.

The second embodiment of the hydraulic system 110 further comprises a hydraulic actuator 135 accommodated in the housing unit 111. The hydraulic actuator 135 has a piston rod assembly 136 received therein to be reciprocably moved by the hydraulic pump 120 to assume two different positions consisting a retraction position Pr where the piston rod assembly 136 is positioned at its retracted position and locked by an up-lock cylinder 173 (see FIG. 4) and an extended position Pe where the piston rod assembly 136 is positioned at its extended position.

The piston rod assembly 136 comprises a piston rod 137 formed with a central cavity 138 having a center axis in coaxial relationship with the axis 114a of the central cavity 114 of the housing unit 111 and axially movably received in the annular guide portion 116 of the housing unit 111, an orifice 139 having one end connected to the central cavity 138 of the piston rod 137 and the other end open to exterior ambient air, a piston 140 integrally formed with the piston rod 137 and axially movably received in the hydraulic actuator 135 of the housing unit 111 to form first and second pressure chambers 135c and 135d and having first and second axial end faces 140a and 140b to receive the hydraulic pressure of the hydraulic fluid thereon. The piston rod 137 of the piston rod assembly 136 is formed with an eye 196 used for connection with other parts of the aircraft not shown.

The housing unit 111 is further formed with a through bore 141, first and second openings 141a and 141b positioned at the both longitudinal ends of the through bore 141. The second embodiment of the hydraulic system 110 further comprises a shuttle valve 142 which comprises a rod portion 143 slidably received in the through bore 141, and first and second ball portions 143a and 143b securely connected with the both longitudinal ends of the rod portion 143. The rod portion 143 of the shuttle valve 142 has a suitable length so as to enable the first and second openings 141a and 141b to be selectively closed and open by the first and second ball portions 143a and 143b, respectively, when each of the first and second ball portions 143a and 143b is subjected to the hydraulic pressure of the hydraulic fluid to have the rod portion 143 moved axially with respect to the housing unit 111.

It is thus to be understood that the shuttle valve 142 is accommodated in the housing unit 111 and positioned between the hydraulic pump 120 and the hydraulic actuator 135 and movable with respect to the housing unit 111 to assume two different positions for selectively changing the flow of the hydraulic fluid between the hydraulic pump 120 and the hydraulic actuator 135.

The second embodiment of the hydraulic system 110 further comprises a dump valve 145 accommodated in the housing unit 111. FIG. 8 particularly shows the elements and parts of the dump valve 145. The dump valve 145 comprises a valve bore 145a formed in the housing unit 111, a valve body 146 slidably received in the valve bore 145a and axially movable with respect to the housing unit 111, the valve body 146 being formed with first to third annular lands 146a, 146b and 146c in axially spaced relationship with each other, a first annular groove 146d between the first and second annular lands 146a and 146b, a second annular groove 146e between the second and third annular lands 146b and 146c, a compression coil spring 147 received in the valve bore 145a to upwardly urge the valve body 146 in FIG. 8, and first to fourth ports open at the valve bore 145a, the first port being held in and out of communication with the through bore 141 of the shuttle valve 142 and the hydraulic pump 120, the second port being held in and out of communication with the pressure chamber 114c of the center cavity 114 and the first pressure chamber 135c of the hydraulic actuator 135, the third port being held in and out of communication with the through bore 141 of the shuttle valve 142, and the fourth port being held in and out of communication with the second pressure chamber 135d of the hydraulic actuator 135. The first land 146a of the valve body 146 is formed with a bypass 148 which is to be held in and out of the communication with the hydraulic pump 120 and the hydraulic actuator 135.

Figure 8:
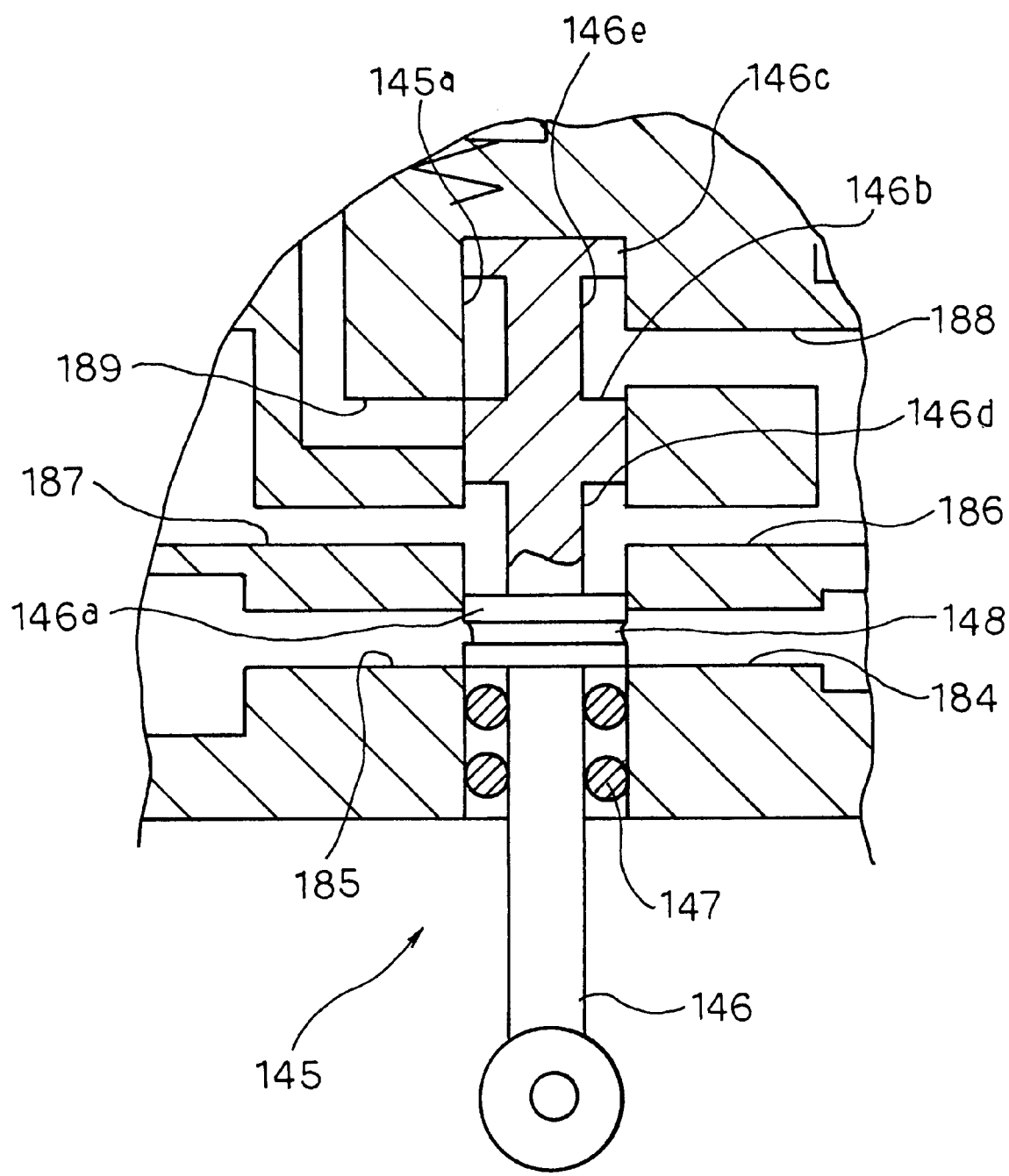
FIG. 8 is an enlarged fragmentary cross-sectional view of a dump valve forming part of the second embodiment of the hydraulic system.

The dump valve 145 is movable in response to the downward movement in FIG. 8 of the valve body 146, by an operator when either one of the hydraulic pump 120 and the driving motor 125 become out of order to assume an abnormal position from a normal position shown in FIG. 8.

When the dump valve 145 is positioned at the normal position as shown in FIG. 8, the first and third ports and second port are respectively held in communication with the through bore 141 of the shuttle valve 142 and the pressure chamber 114c of the center cavity 114 while the fourth port is held out of communication with the second pressure chamber 135d of the hydraulic actuator 135. The first pressure chamber 135c of the hydraulic actuator 135 is held in communication with the hydraulic pump 120 through the bypass 148 of the first land 146a.

When the dump valve 145 is moved downward in FIG. 8 to the abnormal position, the first port comes to be held in communication with the hydraulic pump 120 and the through bore 114 of the shuttle valve 142, the second port comes to be held in communication with the first pressure chamber 135c of the hydraulic actuator 135 and the pressure chamber 114c of the central cavity 114, and the fourth port comes to be held in communication with the second pressure chamber 135d of the hydraulic actuator 135. The third port remains to be held in communication with the through bore 141 of the shuttle valve 142. This result in the fact that the first pressure chamber 135c of the hydraulic actuator 135 and the second pressure chamber 135d of the hydraulic actuator 135 come to be held in communication with each other through first and second ports of the dump valve, the through bore 141 of the shuttle valve 142 and third and fourth ports of the dump valve 145.

It is to be seen from the above description that the dump valve 145 is movable with respect to the housing unit 111 to assume two different positions consisting of the normal position where the hydraulic actuator 135 is reciprocably moved by the hydraulic pump 120 to assume the retraction position and the extended position and the abnormal position where the hydraulic pressures of the hydraulic fluid in the first and second pressure chambers 135c and 135d of the hydraulic actuator 135 become equal to have the piston rod assembly 136 freely movable with respect to the housing unit 111 toward the extended position of the piston rod assembly 136.

The second embodiment of the hydraulic system 110 further comprises a pressure retaining mechanism 160.

The pressure retaining mechanism 160 is accommodated in the central cavity 114 of the housing unit 111 and comprises a valve member 161 axially slidably received in the central cavity 114 to have a pressure chamber 114c and a non-pressure chamber 114d separated therebetween, the pressure chamber 114c being held in communication with the through bore 141 of the shuttle valve 142 and the non-pressure chamber 114d being held in communication with exterior ambient air through the central cavity 138 of the piston rod 137 of the piston rod assembly 136 and the orifice 139 of the piston rod 137 of the piston rod assembly 136, and a compression coil spring 163 received in the non-pressure chamber 114d of the central cavity 114 to axially urge the valve member 161 toward the shuttle valve 142 against the hydraulic pressure of the hydraulic fluid in the pressure chamber 114c of the central cavity 114.

The above construction of the pressure retaining mechanism 160 leads to the fact that the valve member 161 can retain the hydraulic pressure of the hydraulic fluid in the pressure chamber 114c of the central cavity 114 by being moved toward and away from the shuttle valve 142 in accordance with the hydraulic pressure force of the hydraulic fluid in the pressure chamber 114c against the force of compression coil spring 163.

The second embodiment of the hydraulic system 110 further comprises a mechanically locking mechanism 165 accommodated in the small diameter cavity 111b around the annular guide portion 116 of the housing unit 111.

The mechanically locking mechanism 165 comprises a ring member 166 slidably received in the annular guide portion 116 and formed with a pressure receiving face to receive the hydraulic pressure of the hydraulic fluid thereon. The pressure receiving face of the ring member 166 has a radially inner inclined face portion inclined with respect to the center axis 114a of the central cavity 114 of the housing unit 111. The ring member has a radially outer face portion substantially perpendicular to the center axis 114a of the central cavity 114 of the housing unit 111, a radially inner portion formed with an annular inner groove, a radially outer portion formed with an annular outer groove, and a compression coil spring 167 received in the annular inner groove and on the annular guide portion 116 of the housing unit 111 to resiliently urge the ring member 166 toward the large diameter cavity 111a against the hydraulic pressure of the hydraulic fluid received on the pressure receiving face of the ring member 166.

The annular guide portion 116 of the housing unit 111 has an end portion axially spaced apart from the second end wall portion 113 of the housing unit 111 and formed with a first group of radial through bores not shown in the drawings and circumferentially equally formed to allow the hydraulic fluid to pass therethrough to and from the second pressure chamber 135d of the hydraulic actuator 135, and a second group of radial through bores also not shown in the drawings and circumferentially equally formed and each of which is disposed between the two neighboring radial through bores of the first group. The end portion of the annular guide portion 116 further comprises a plurality of locking members 168 each radially movably received in each of the second group of the radial through bores to be engageable with the radially outer face of the piston rod 137 of the piston rod assembly 136.

This means that each of the locking members 168 can assume a first radial position where each of the locking members 168 is held in frictional contact with the radially outer face of the piston rod 137 of the piston rod assembly 136 to lock the piston rod 136 with the housing unit 111 when the ring member 166 is resiliently urged and axially moved toward the large cavity 111a of the housing unit 111 by the compression coil spring 167 against the hydraulic pressure of the hydraulic fluid received on the pressure receiving face of the ring member 166, and a second radial position where each of the locking members 168 is released and held out of frictional contact with the radially outer face of the piston rod 137 of the piston rod assembly 136 to unlock the piston rod 137 from the housing unit 111 when the ring member 166 is urged and axially moved away from the large cavity 111a of the housing unit 111 toward the second end wall portion 113 of the housing unit 111 by the hydraulic pressure of the hydraulic fluid received on the pressure receiving face of the ring member 166 against the compression coil spring 167. The mechanically locking mechanism 165 further comprises a position sensor 169 for sensing the axial position of the ring member 166 to output a signal when the ring member 166 is urged and axially moved away from the large cavity 111a of the housing unit 111 toward the second end wall portion 113 of the housing unit 111. The outputted signal is transmitted to an lump, not shown in the drawings, which is turned on to inform a pilot of the state of the mechanically locking mechanism 165.

It is thus to be noted that the mechanically locking mechanism 165 can lock the piston rod 137 with the housing unit 111 when the hydraulic pump 120 is not driven by the driving motor 125 and can unlock the piston rod 137 from the housing unit 111 to be freely moved when the hydraulic pump 120 is driven by the driving motor 125.

The second embodiment of the hydraulic system further comprises a hydraulic pressure compensator 150 which comprises a piston 151 slidably received in a cavity 150a formed in the housing unit 111 in the vicinity of the hydraulic actuator 135 to be held in communication with the second pressure chamber 135d of the hydraulic actuator 135, and a compression coil spring 152 received in the cavity 150a to urge the piston 151 in a direction having the hydraulic pressure of the hydraulic fluid in the cavity 150a increased to prevent the hydraulic pressure of the second pressure chamber 135a of the hydraulic actuator 135 from being decreased resulting from some reasons. For this reason, the pressure of the hydraulic pressure compensator 150 is retained at a constant value. It is thus to be noted that the above mentioned hydraulic pressure compensator 150 can control the hydraulic pressure in the hydraulic fluid discharged from the hydraulic pump 120 and received in the second pressure chamber 135d of the hydraulic actuator 135.

Figure 4:
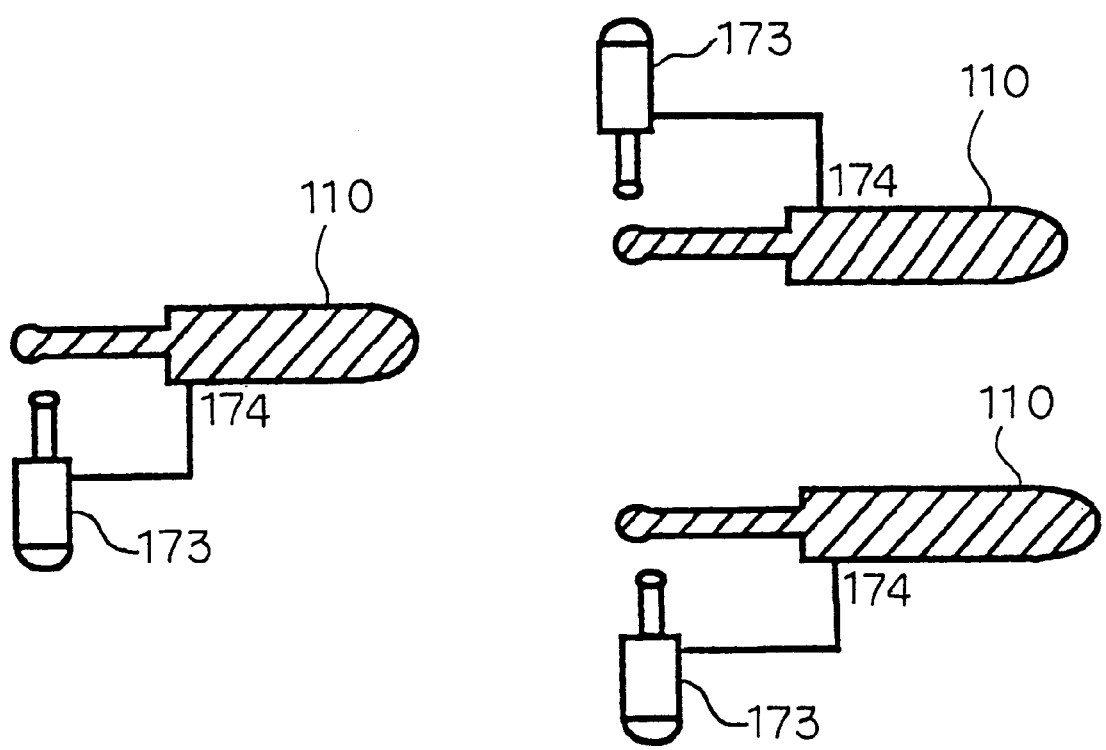
FIG. 4 is a schematic view similar to FIG. 2 but showing an arrangement of the second embodiment of the hydraulic system according to the present invention in association with three up-lock cylinders assembled to an aircraft.

The cavity 150a of the hydraulic pressure compensator 150 is formed with a pressure inlet-outlet port held in communication with an up-lock cylinder 173 shown in FIG. 4. The up-lock cylinder 173 has a pressure chamber to be held in communication with the pressure inlet-outlet port 174 of the hydraulic pressure compensator 150. This means that the pressure chamber of the up-lock cylinder 173 is held in communication with the second pressure chamber 135d of the hydraulic actuator 135 to be subjected to the hydraulic pressure same as the hydraulic pressure in the second pressure chamber 135d of the hydraulic actuator 135.

The second embodiment of the hydraulic system further comprises a two-position solenoid valve 155 provided between the hydraulic pump 120 and the second pressure chamber 135d of the hydraulic actuator 135 to assume a first position where the hydraulic fluid between the hydraulic pump 120 and the second pressure chamber 135d of the hydraulic actuator 135 is allowed to pass therethrough when the piston rod assembly 136 is being moved toward its retracted position Pr and its extended position Pe, and a second position where the hydraulic fluid between the hydraulic pump 120 and the hydraulic actuator 135 is not allowed to pass therethrough when the piston rod assembly 136 is held at its retracted position Pr and its extended position Pe. The two-position solenoid valve 155 is operated to assume the first and second positions by an appropriate electric circuit not shown in the drawings.

The housing unit has first to tenth fluid passageways 180 to 189.

The first fluid passageway 180 is connected at its one end to the first inlet/outlet port 120a of the hydraulic pump 120 and at its other end to the first opening 141a of the shuttle valve 142. The second fluid passageway 181 is connected at its one end to the second inlet/outlet port 120b of the hydraulic pump 120 and at its other end to the second opening 141b of the shuttle valve 142. The first and second fluid passageways 180 and 181 are respectively connected at their halfway with the hydraulic pressure controller 126.

The third and fourth fluid passageways 182 and 183 are connected with each other at their one ends via the two-position solenoid valve 155 and respectively connected at their other ends to the first opening 141a of the shuttle valve 142 and to the second pressure chamber 135d of the hydraulic actuator 135 through the annular guide portion 116. The fourth passageway 183 has a restricting member 193 which is designed to have the hydraulic fluid to restrictively pass therethrough so that the amount of the hydraulic fluid is limited at a certain level when the hydraulic fluid passes the restricting member 193. The fourth passageway 183 is also connected at its halfway with the hydraulic pressure compensator 150 to be held in communication with the up-lock cylinder 174.

The fifth and sixth fluid passageways 184 and 185 are connected with each other at their one ends via either the bypass of the first land 146a or the first and second port of the dump valve 145 and respectively connected at their other ends to the second opening 141b of the shuttle valve 142 and to the first pressure chamber 135c of the hydraulic actuator 135.

The seventh fluid passageway 186 is connected at its one end to the through bore 141 of the shuttle valve 142 and at its other end to the first port of the dump valve 145. The eighth fluid passageway 187 is connected at its one end to the pressure chamber 114c of the central cavity 114 and at its other end to the second port of the dump valve 145.

The ninth fluid passageway 188 is connected at its one end to the through bore 141 of the shuttle valve 142 and at its other end to the third port of the dump valve 145. The tenth fluid passageway 189 is connected at its one end to the fourth fluid passageway 183 to be fed to the second pressure chamber of the hydraulic actuator and is to be connected at its other end to the fourth port of the dump valve 145.

The housing unit 111 further has eleventh fluid passageway 190 having one end connected to a drain port 191 of the hydraulic pump 120 and the other end connected to the through bore 141 of the shuttle valve 142. The eleventh fluid passageway 190 is provided at its halfway with a drain filter 192 which serves to filtrate the hydraulic fluid drained from the through bore 141 of the shuttle valve 142.

The operation of the second embodiment of the hydraulic system 110 according to the present invention is identical to the operation of the first embodiment of the hydraulic system 10 according to the present invention, so that the operation of the second embodiment of the hydraulic system 110 identical to that of the first embodiment of the hydraulic system 10 will not be described and only the operation of the second embodiment of the hydraulic system 110 which is not identical to that of the first embodiment of the hydraulic system 10 will be described hereinlater.

Figure 3:
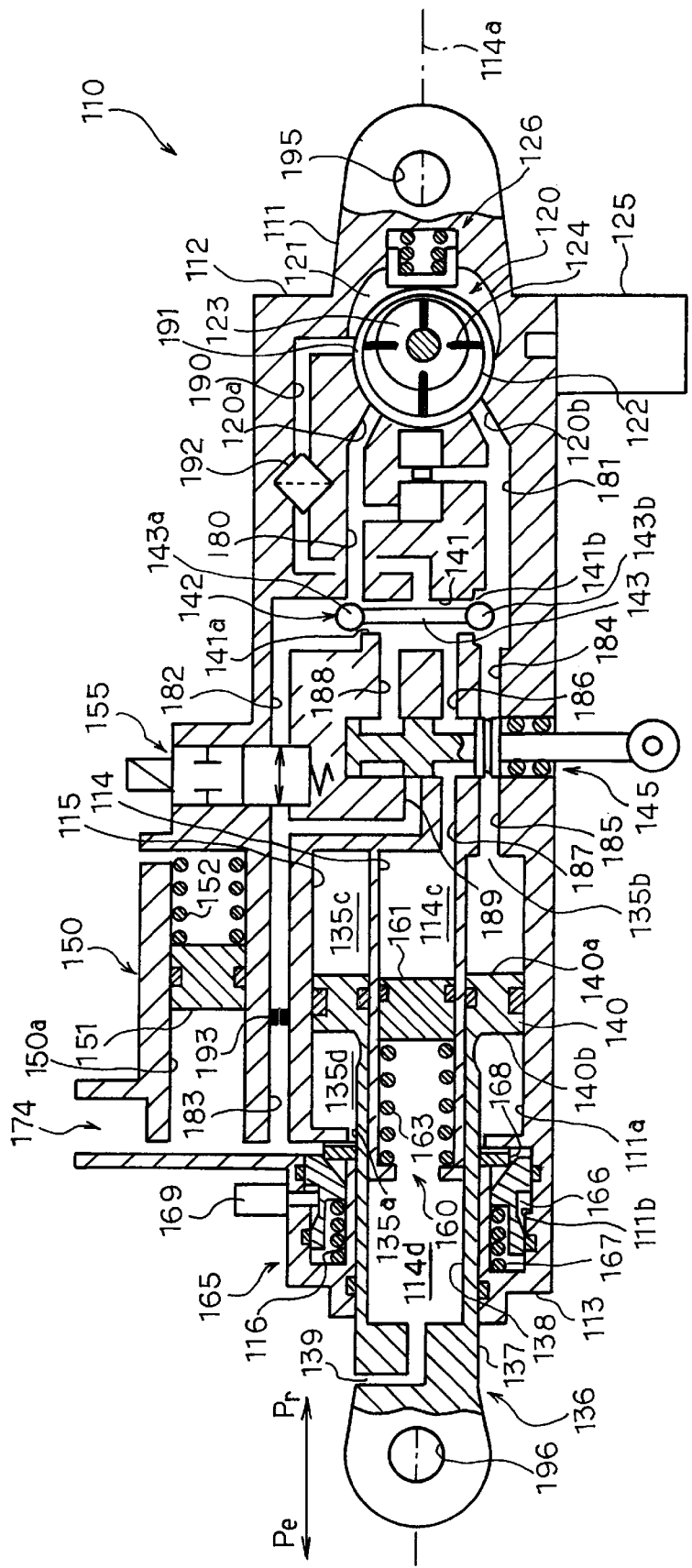
FIG. 3 is a longitudinal cross-sectional view similar to FIG. 1 but showing a second preferred embodiment of the hydraulic system according to the present invention.

It is assumed, same as the assumption in the above described first embodiment of the hydraulic system 10, that the hydraulic fluid is introduced into the interior of the hydraulic pump 120 through the first inlet/outlet port 120a and discharged out of the hydraulic pump 120 through the second inlet/outlet port 120b when the hydraulic pump 20 is rotated anti-clockwise in FIG. 3 by the driving motor 125. Under these conditions, the first inlet/outlet port 120a serves as an inlet port of the hydraulic fluid while the second inlet/outlet port 120b serves as an outlet port of the hydraulic fluid.

On the other hand, it is assumed that the hydraulic fluid is introduced into the interior of the hydraulic pump 120 through the second inlet/outlet port 120b and discharged out of the hydraulic pump 120 through the first inlet/outlet port 120a when the hydraulic pump 120 is rotated clockwise in FIG. 3 by the driving motor 125. Under these conditions, the second inlet/outlet port 120b serves as an inlet port of the hydraulic fluid while the first inlet/outlet port 120a serves as an outlet port of the hydraulic fluid.

When the driving motor 125 is driven to rotate the hydraulic pump 120 clockwise in FIG. 3 to supply the hydraulic pressure to the second pressure chamber 135d of the hydraulic actuator 135, the piston rod 137 of the piston rod assembly 136 is moved away from the second end wall portion 113 of the housing unit 11 to assume the retraction position (Pr) by the hydraulic pressure supplied to the second pressure chamber 135d of the hydraulic actuator 135. After this movement of the piston rod 137 of the piston rod assembly 136 is completed, the two-position solenoid valve 155 is moved downward in FIG. 3 to assume the second position where the hydraulic fluid between the hydraulic pump 120 and the hydraulic actuator 135 is not allowed to pass therethrough. Under these conditions, no hydraulic pressure of the hydraulic fluid is supplied to or withdrawn from the second pressure chamber 135d of the hydraulic actuator 135 and the hydraulic pressure controller retains the hydraulic pressure of the hydraulic fluid in the second pressure chamber 135d of the hydraulic actuator 135 at its constant value.

When, on the other hand, the driving motor 125 is driven to rotate the hydraulic pump 120 anti-clockwise in FIG. 3 to supply the hydraulic pressure to the first pressure chamber 135c of the hydraulic actuator 135, the piston rod 137 of the piston rod assembly 136 is moved toward the second end wall portion 113 of the housing unit 111 to assume the extended position (Pe) by the hydraulic pressure supplied to the first pressure chamber 135c of the hydraulic actuator 135. After this movement of the piston rod 137 of the piston rod assembly 136 is completed, the two-position solenoid valve 155 is moved downward in FIG. 3 to assume the second position where the hydraulic fluid between the hydraulic pump 120 and the hydraulic actuator 135 is not allowed to pass therethrough. Under these conditions, no hydraulic pressure of the hydraulic fluid is supplied to or withdrawn from the second pressure chamber 135d of the hydraulic actuator 135 and the hydraulic pressure controller 150 retains the hydraulic pressure of the hydraulic fluid in the second pressure chamber 135d of the hydraulic actuator 135 at its constant value.

This results in the fact that the piston rod assembly 136 is locked and held at its retracted position (Pr) and its extended position (Pe) when the two-position solenoid valve 155 is at its second position.

When the hydraulic pump 120 or the driving motor 125 becomes out of order, the dump valve 145 is moved downward in FIG. 3 to assume its abnormal position. At this time, the first and second pressure chambers 135c and 135d come to be held in communication with each other through the sixth fluid passageway 185, the first and second ports of the dump valve 145, the seventh fluid passageway 186, the through bore 141 of the shuttle valve 142, the ninth fluid passageway 188, the third and fourth ports of the dump valve 145, tenth fluid passageway 189, and the fourth fluid passageway 183. This results in the fact that the hydraulic pressures of the hydraulic fluid in the first and second pressure chambers 135c and 135d of the hydraulic actuator 135 become equal to have the piston rod assembly 136 freely movable with respect to the housing unit 111 toward the extended position of the piston rod assembly 136 by the gravity of the piston rod assembly 136.

When, on the other hand, the hydraulic pump 120 or the driving motor 125 is returned to its normal operation, the dump valve 145 is held at its normal position shown in FIG. 3.

Figure 5:
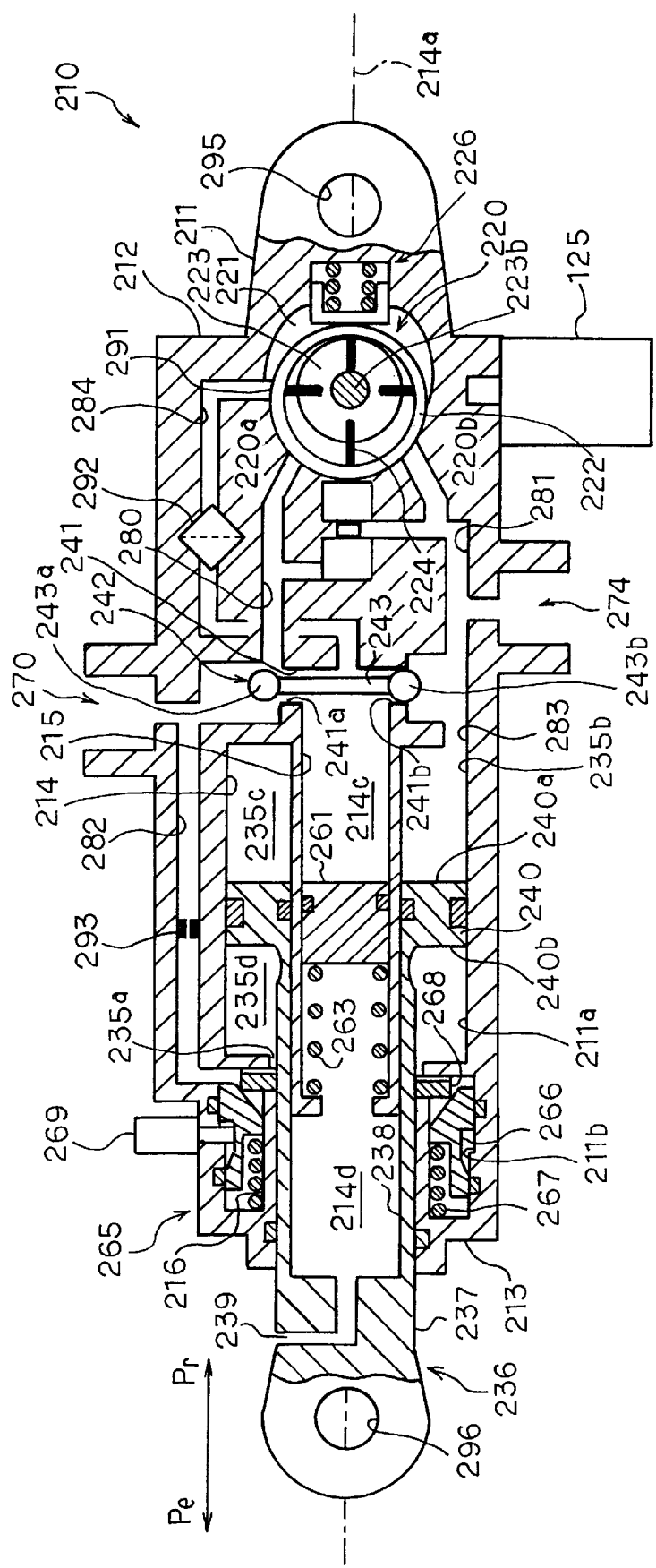
FIG. 5 is a longitudinal cross-sectional view similar to FIGS. 1 and 3 but showing a third preferred embodiment of the hydraulic system according to the present invention.

The third embodiment of the hydraulic system according to the present invention will be described hereinlater with reference to the drawings, particularly to FIGS. 5 and 6.

The third embodiment of the hydraulic system 210 comprises a housing unit 211. The housing unit 211 is formed with a large diameter cavity 211a having an opening end and a closing end, and a small diameter cavity 211b smaller in diameter than the large diameter cavity 211a and having an opening end connected with the opening end of the large diameter cavity 211a and a closing end.

The housing unit 211 has a first end wall portion 212 and a second end wall portion 213 and is formed with a central cavity 214 having a center axis 214a, an actuator cavity 235 surrounding the central cavity 214 and positioned in coaxial relationship with the central cavity 214. The housing unit 211 further has an annular guide portion 216 axially extending toward the first end wall portion 212 from the second end wall portion 213 along the center axis 214a of the central cavity 214. The first end wall portion 212 of the housing unit 211 has secured thereto a bracket being formed with an eye 295 used for connection with other parts of the aircraft not shown.

The third embodiment of the hydraulic system 210 further comprises a hydraulic pump 220 accommodated in the housing unit to discharge therefrom and introduce therein a hydraulic fluid.

The hydraulic pump 220 comprises a cavity 221 formed in the housing unit 211 in the neighborhood of the first end wall portion 212 of the housing unit 211 and a ring member 222 received in the cavity 221 and movably retained by the housing unit 211, the ring member 222 being formed with first and second inlet/outlet ports 220a, 220b and having a center axis, an eccentric member 223 received in the ring member 222 and having an eccentric shaft 223b rotatably supported by the housing unit 211 with an eccentric axis eccentric with respect to the center axis of the ring member 222, a plurality of vane members 224 equi-angularly positioned around the eccentric axis of the eccentric member 223 and radially outwardly extending to have their respective leading radial ends resiliently held in sliding contact with the inner surface of the ring member 222 by a compression coil spring not shown in the drawings.

It is therefore appreciated that the hydraulic fluid is introduced into the interior of the ring member 222 and discharged out of the interior of the ring member 222 under the influence of the vane members 224 radially retracted out of and extended into contact with the ring member 222 when the eccentric member 223 is rotated around the eccentric axis of the eccentric shaft 223b.

The third embodiment of the hydraulic system 210 further comprises a pressure controller 226 which is substantially identical to the pressure controller 26 of the first embodiment of the hydraulic system according to the present invention shown in FIGS. 1, 7(A) and 7(B) so that the elements or parts of the pressure controller 226 of the second embodiment of the hydraulic system 210 will not be described hereinafter.

The third embodiment of the hydraulic system further comprises a driving motor 225 drivably connected with the eccentric shaft 223b of the hydraulic pump 220 to impart rotation motion to the eccentric shaft 223b of the hydraulic pump 220.

The third embodiment of the hydraulic system 210 further comprises a hydraulic actuator 235 accommodated in the housing unit 211. The hydraulic actuator 235 has a piston rod assembly 236 received therein to be reciprocably moved by the hydraulic pump 220 to assume two different positions consisting a retraction position Pr where the piston rod assembly 236 is positioned at its retracted position and locked by the up-lock cylinder 273 and an extended position Pe where the piston rod assembly 236 is positioned at its extended position.

The piston rod assembly 236 comprises a piston rod 237 formed with a central cavity 238 having a center axis in coaxial relationship with the axis 214a of the central cavity 214 of the housing unit 211 and axially movably received in the annular guide portion 216 of the housing unit 211, an orifice 239 having one end connected to the central cavity 238 of the piston rod 237 and the other end open to exterior ambient air, a piston 240 integrally formed with the piston rod 237 and axially movably received in the hydraulic actuator 235 of the housing unit 211 to form first and second pressure chambers 235c and 235d and having first and second axial end faces 240a and 240b to receive the hydraulic pressure of the hydraulic fluid thereon. The piston rod 237 of the piston rod assembly 236 is formed with an eye 296 used for connection.

The housing unit 211 is further formed with a through bore 241, first and second openings 241a and 241b positioned at the both longitudinal ends of the through bore 241. The third embodiment of the hydraulic system 210 further comprises a shuttle valve 242 which comprises a rod portion 243 slidably received in the through bore 241, and first and second ball portions 243a and 243b securely connected with the both longitudinal ends of the rod portion 243. The rod portion 243 of the shuttle valve 242 has a suitable length so as to enable the first and second openings 241a and 241b to be selectively closed and open by the first and second ball portions 243a and 243b, respectively, when each of the first and second ball portions 243a and 243b is subjected to the hydraulic pressure of the hydraulic fluid to have the rod portion 243 moved axially with respect to the housing unit 211.

It is thus to be understood that the shuttle valve 242 is accommodated in the housing unit 211 and positioned between the hydraulic pump 220 and the hydraulic actuator 235 and movable with respect to the housing unit 211 to assume two different positions for selectively changing the flow of the hydraulic fluid between the hydraulic pump 220 and the hydraulic actuator 235.

The third embodiment of the hydraulic system 210 further comprises a pressure retaining mechanism 260.

The pressure retaining mechanism 260 is accommodated in the central cavity 214 of the housing unit 211 and comprises a valve member 261 axially slidably received in the central cavity 214 to have a pressure chamber 214c and a non-pressure chamber 214d separated therebetween, the pressure chamber 214c being held in communication with the through bore 241 of the shuttle valve 242 and the non-pressure chamber 214d being held in communication with exterior ambient air through the central cavity 238 of the piston rod 237 of the piston rod assembly 236 and the orifice 239 of the piston rod 237 of the piston rod assembly 236, and a compression coil spring 263 received in the non-pressure chamber 214d of the central cavity 214 to axially urge the valve member 261 toward the shuttle valve 242 against the hydraulic pressure of the hydraulic fluid in the pressure chamber 214c of the central cavity 214.

The above construction of the pressure retaining mechanism 260 leads to the fact that the valve member 261 can retain the hydraulic pressure of the hydraulic fluid in the pressure chamber 214c of the central cavity 214 by being moved toward and away from the shuttle valve 242 in accordance with the hydraulic pressure force of the hydraulic fluid in the pressure chamber 214c against the force of compression coil spring 263.

The third embodiment of the hydraulic system 210 further comprises a mechanically locking mechanism 265 accommodated in the small diameter cavity 211b around the annular guide portion 216 of the housing unit 211.

The mechanically locking mechanism 265 comprises a ring member 266 slidably received around the annular guide portion 216, being formed with a pressure receiving face to receive the hydraulic pressure of the hydraulic fluid thereon and having a radially inner inclined face portion inclined with respect to the center axis 214a of the central cavity 214 of the housing unit 211 and a radially outer face portion substantially perpendicular to the center axis 214a of the central cavity 214 of the housing unit 211, a radially inner portion formed with an annular inner groove, a radially outer portion formed with an annular outer groove, and a compression coil spring 267 received in the annular inner groove and on the annular guide portion 216 of the housing unit 211 to resiliently urge the ring member 266 toward the large diameter cavity 211a against the hydraulic pressure of the hydraulic fluid received on the pressure receiving face of the ring member 266.

The annular guide portion 216 of the housing unit 211 has an end portion axially spaced apart from the second end wall portion 213 of the housing unit 211 and formed with a first group of radial through bores not shown in the drawings and circumferentially equally formed to allow the hydraulic fluid to pass therethrough to and from the second pressure chamber 235d of the hydraulic actuator 235, and a second group of radial through bores also not shown in the drawings and circumferentially equally formed and each of which is disposed between the two neighboring radial through bores of the first group. The end portion of the annular guide portion 216 further comprises a plurality of locking members 268 each radially movably received in each of the second group of the radial through bores to be engageable with the radially outer face of the piston rod 237 of the piston rod assembly 236.

This means that each of the locking members 268 can assume a first radial position where each of the locking members 268 is held in frictional contact with the radially outer face of the piston rod 237 of the piston rod assembly 236 to lock the piston rod 236 with the housing unit 211 when the ring member 266 is resiliently urged and axially moved toward the large cavity 211a of the housing unit 211 by the compression coil spring 267 against the hydraulic pressure of the hydraulic fluid received on the pressure receiving face 266a of the ring member 266, and a second radial position where each of the locking members 268 is released and held out of frictional contact with the radially outer face of the piston rod 237 of the piston rod assembly 236 to unlock the piston rod 237 from the housing unit 211 when the ring member 266 is urged and axially moved away from the large cavity 211a of the housing unit 211 toward the second end wall portion 213 of the housing unit 211 by the hydraulic pressure of the hydraulic fluid received on the pressure receiving face of the ring member 266 against the compression coil spring 267. The mechanically locking mechanism 265 further comprises a position sensor 269 for sensing the axial position of the ring member 266 to output a signal when the ring member 266 is urged and axially moved away from the large cavity 211a of the housing unit 211 toward the second end wall portion 213 of the housing unit 211. The outputted signal is transmitted to an lump, not shown in the drawings, which is turned on to inform a pilot of the state of the mechanically locking mechanism 265.

It is thus to be noted that the mechanically locking mechanism 265 can lock the piston rod 237 with the housing unit 211 when the hydraulic pump 220 is not driven by the driving motor 225 and can unlock the piston rod 237 from the housing unit 211 to be freely moved when the hydraulic pump 220 is driven by the driving motor 225.

The housing unit 211 in the third embodiment of the hydraulic system 210 is further formed with a pressure imparting port 270 to have the hydraulic pressure of the hydraulic fluid pass therethrough and with a pressure inlet/outlet port 273 to be connected with an up-lock cylinder 273 to have the hydraulic pressure of the hydraulic fluid pass therethrough.

The pressure imparting port 270 is held in communication with the second pressure chamber of the hydraulic actuator via the annular guide portion of the hydraulic actuator and with the first opening of the through bore 241. The pressure imparting port 270 is in turn to be held in communication with an exterior pressure imparting port.

The pressure inlet/outlet port 273 is held in communication with the first pressure chamber 235c of the hydraulic actuator 235 and with the second opening of the through bore 241. The pressure inlet/outlet port 273 is in turn to be held in communication with an exterior pressure inlet/outlet port.

Figure 6:
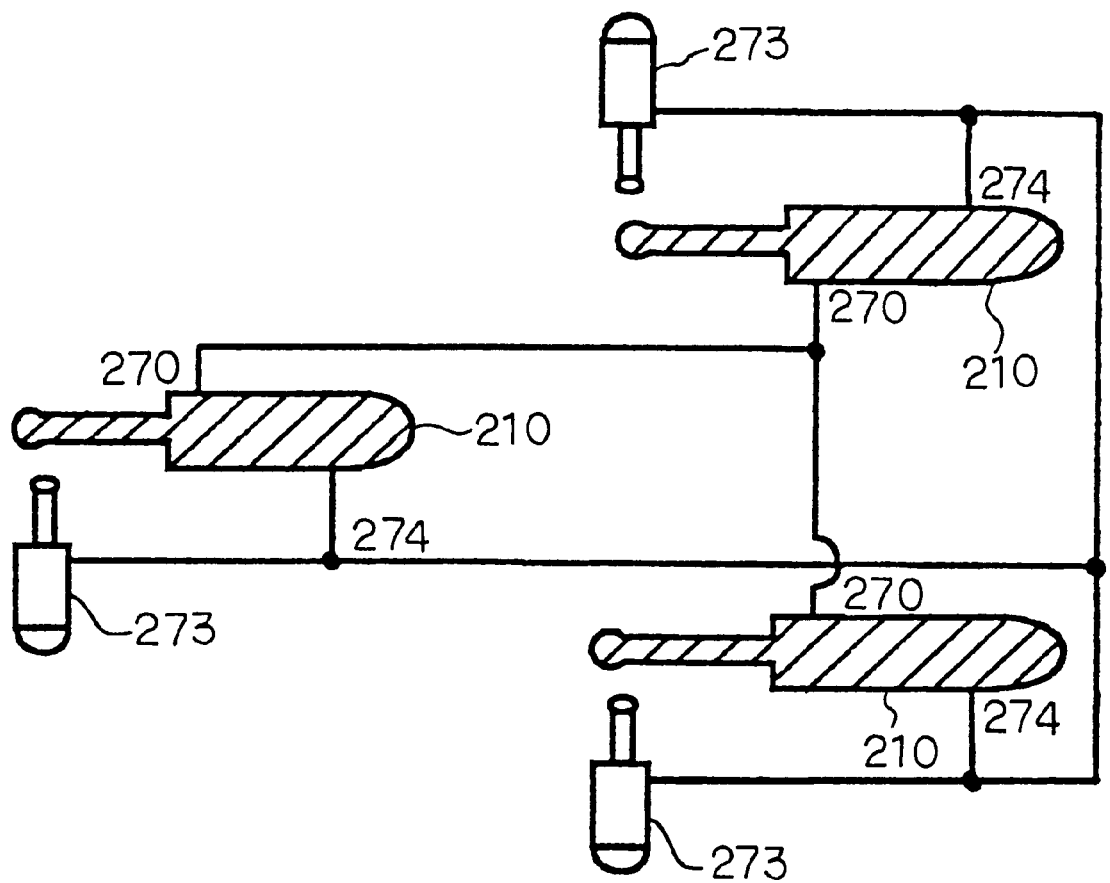
FIG. 6 is a schematic view similar to FIGS. 2 and 4 but showing an arrangement of the third embodiment of the hydraulic system according to the present invention in association with three up-lock cylinders assembled to an aircraft.

FIG. 6 shows three hydraulic systems 210 and three up-lock cylinders 273 respectively operatively connected with the hydraulic systems 210. Each of the pressure imparting ports 270 of the hydraulic systems 210 are held in communication with each other while each of the pressure inlet/outlet ports 274 of the hydraulic systems 210 are held in communication with each other.

The above construction of the pressure imparting port 270 and the pressure inlet/outlet port 274 leads to the fact that the hydraulic system can be properly operated even when the hydraulic pump 220 or the driving motor 225 of one of the hydraulic system becomes damaged, because the pressure imparting port and the pressure inlet/outlet port of the hydraulic system are respectively connected to the pressure imparting ports and the pressure inlet/outlet ports of other two hydraulic systems. It means that the hydraulic fluid is introduced into and discharged out of each of the housing units 211 through their pressure imparting ports and the pressure inlet/outlet ports on the basis of the hydraulic pressure difference between each of the pressure imparting ports and the pressure inlet/outlet ports of three hydraulic systems as shown in FIG. 6.

Each of the up-lock cylinders 273 has a pressure chamber held in communication with the pressure inlet-outlet port 274 formed in the housing unit 211. The pressure chamber of the up-lock cylinder 273 is usually held in communication with the first pressure chamber 235c of the hydraulic actuator 235 to be subjected to the hydraulic pressure same as the hydraulic pressure in the first pressure chamber 235c of the hydraulic actuator 235.

The housing unit 211 has first, second, third and fourth fluid passageways 280, 281, 282 and 283.

The first fluid passageway 280 is connected at its one end to the first inlet/outlet port 220a of the hydraulic pump 220 and at its other end to the first opening 241a of the shuttle valve 242. The second fluid passageway 281 is connected at its one end to the second inlet/outlet port 220b of the hydraulic pump 220 and at its other end to the second opening 241b of the shuttle valve 242. The first and second fluid passageways 280 and 281 are respectively connected at their halfway with the first and second pistons 232 and 233 of the second biasing means 228 to have the first and second pistons 232 and 233 subjected to the hydraulic pressure of hydraulic fluid passing through the first and second fluid passageways 280 and 281.

The second fluid passageway 281 is also connected at its halfway with the pressure inlet/outlet port 274 to be held in communication with the up-lock cylinder 73 and with the pressure inlet/outlet ports of the exterior hydraulic systems.

The third fluid passageway 282 is connected at its one end to the first opening 241a of the shuttle valve 242 and at its other end to the annular guide portion 216. The third passageway has a restricting member 293 which is designed to have the hydraulic fluid to restrictively pass therethrough so that the amount of the hydraulic fluid is limited at a certain level when the hydraulic fluid passes the restricting member 293. The fourth fluid passageway 284 is connected at its halfway with the pressure imparting port 270 to be held in communication with the pressure imparting ports of the exterior hydraulic systems.

The fourth fluid passageway 284 is connected at its one end to the second opening 241b of the shuttle valve 242 and at its other end to the first pressure chamber 235c of the hydraulic actuator 235.

The housing unit 211 further has fifth fluid passageway 284 having one end connected to a drain port 291 of the hydraulic pump 220 and the other end connected to the through bore 241 of the shuttle valve 242. The fifth passageway 284 is provided at its halfway with a drain filter 292 which serves to filtrate the hydraulic fluid drained from the through bore 241 of the shuttle valve 242.

The operation of the third embodiment of the hydraulic system 210 according to the present invention is identical to the operation of the first embodiment of the hydraulic system 10 according to the present invention, so that the operation of the third embodiment of the hydraulic system 210 identical to that of the first embodiment of the hydraulic system 10 will not be described but only the operation of the third embodiment of the hydraulic system 210 which is not identical to that of the first embodiment of the hydraulic system 10 will be described hereinlater.

When the hydraulic pump 220 or the driving motor 225 accommodated in one of the hydraulic systems provided at an aircraft becomes out of order, the hydraulic fluid is supplied from other hydraulic systems which are provided on the aircraft through either the pressure imparting port 270 or the pressure inlet/outlet port 273.

When the hydraulic fluid is supplied to the hydraulic system 210 whose hydraulic pump 220 or the driving motor 225 is out of order through the pressure imparting port 270 of the housing unit 211, the hydraulic fluid is fed to the second pressure chamber 235d of the hydraulic actuator 235 to move the piston rod assembly 236 away from the second end wall portion 213 of the housing unit 111 to assume its retraction position (Pr). When, on the other hand, the hydraulic fluid is supplied to the hydraulic system 210 whose hydraulic pump 220 or the driving motor 225 is out of order through the pressure inlet/outlet port 274 of the housing unit 211, the hydraulic fluid is fed to the first pressure chamber 235c of the hydraulic actuator 235 to move the piston rod assembly 236 toward the second end wall portion 213 of the housing unit 111 to assume its extended position. This results in the fact that the hydraulic system can be properly operated even when the hydraulic pump 220 or the driving motor 225 is damaged.

What is claimed is:

1. A hydraulic system for retracting into and extending out of the body of an aircraft a landing gear for use in taking off and landing, comprising:

a housing unit formed with a pressure imparting port to be connected with a fluid pressure reservoir and a pressure inlet/outlet port to be connected with an up-lock cylinder, a hydraulic pump accommodated in said housing unit to discharge therefrom and introduced therein a hydraulic fluid, a driving motor drivably connected with said hydraulic pump to impart rotation motion to said hydraulic pump, a hydraulic actuator accommodated in said housing unit and having a piston rod assembly received therein to be reciprocably moved by said hydraulic pump to assume two different positions consisting a retraction position where said piston rod assembly is positioned at its retracted position and locked by said up-lock cylinder and an extended position where said piston rod assembly is positioned at its extended position, a shuttle valve accommodated in said housing unit and positioned between said hydraulic pump and said hydraulic actuator and movable with respect to said housing unit to assume two different positions for selectively changing the flow of said hydraulic fluid between said hydraulic pump and said hydraulic actuator, an emergency valve accommodated in said housing unit and positioned between said hydraulic pump and said hydraulic actuator and between said pressure imparting port and said hydraulic actuator and movable with respect to said housing unit to assume two different positions for selectively changing the flow of said hydraulic fluid between said hydraulic pump and said hydraulic actuator and the flow of said hydraulic pump and said fluid pressure reservoir, an actuator pressure releasing mechanism accommodated in said housing unit to release said hydraulic pressure in said hydraulic actuator to allow said piston rod assembly to be freely moved with respect to said housing unit toward said extended position of said piston rod assembly, and a mechanically locking mechanism accommodated in said housing unit to lock said piston rod assembly with said housing unit when said hydraulic pump is not driven by said driving motor and to unlock said piston rod assembly from said housing unit to be freely moved when said hydraulic pump is driven by said driving motor.

2. A hydraulic system as set forth in claim 1, in which said driving motor is accommodated in said housing unit.

3. A hydraulic system as set forth in claim 1, in which said driving motor is attached to said housing unit.

4. A hydraulic system as set forth in claim 1, in which said hydraulic pump is constituted by a variable displacement pump.

5. A hydraulic system as set forth in claim 1, in which said hydraulic pump has first and second inlet/outlet ports having said hydraulic fluid introduced into said hydraulic pump and discharged out of said hydraulic pump therethrough, said hydraulic actuator has first and second ports having said hydraulic fluid introduced into and discharged out of said hydraulic actuator therethrough, said first and second inlet/outlet ports being connected with said first and second ports to allow said hydraulic fluid from said hydraulic pump to be introduced into said hydraulic actuator and to allow said hydraulic fluid from said hydraulic actuator to be returned to said hydraulic pump, and which further comprises a hydraulic pressure controller for controlling the hydraulic pressure in the hydraulic fluid discharged from said hydraulic pump.

6. A hydraulic system for retracting into and extending out of the body of an aircraft a landing gear for use in taking off and landing, comprising:

a housing unit formed with a pressure inlet/outlet port to be connected with an up-lock cylinder, a hydraulic pump accommodated in said housing unit to discharge therefrom and introduce therein a hydraulic fluid, a driving motor drivably connected with said hydraulic pump to impart rotation motion to said hydraulic pump, a hydraulic actuator accommodated in said housing unit and having a piston rod assembly received therein to define two pressure chambers, said piston rod assembly being reciprocably moved by said hydraulic pump to assume two different positions consisting a retraction position where said piston rod assembly is positioned at its retracted position and locked by said up-lock cylinder and an extended position where said piston rod assembly is positioned at its extended position, a shuttle valve accommodated in said housing unit and positioned between said hydraulic pump and said hydraulic actuator and movable with respect to said housing unit to assume two different positions for selectively changing the flow of said hydraulic fluid between said hydraulic pump and said hydraulic actuator, a dump valve accommodated in said housing unit and positioned between said hydraulic pump and said hydraulic actuator and movable with respect to said housing unit to assume two different positions consisting of a normal position where said hydraulic actuator is reciprocably moved by said hydraulic pump to assume said retraction position and said extended position, and an abnormal position where the hydraulic pressures of the hydraulic fluid in said pressure chambers of said hydraulic actuator become equal to have said piston rod assembly freely movable with respect to said housing unit toward said extended position of said piston rod assembly, an actuator pressure retaining mechanism accommodated in said housing unit to retain said hydraulic pressure in said hydraulic actuator, and a mechanically locking mechanism accommodated in said housing unit to lock said piston rod assembly with said housing unit when said hydraulic pump is not driven by said driving motor and to unlock said piston rod assembly from said housing unit to be freely moved when said hydraulic pump is driven by said driving motor.

7. A hydraulic system as set forth in claim 6, in which said driving motor is accommodated in said housing unit.

8. A hydraulic system as set forth in claim 6, in which said driving motor is attached to said housing unit.

9. A hydraulic system as set forth in claim 6, in which said hydraulic pump is constituted by a variable displacement pump.

10. A hydraulic system as set forth in claim 6, in which said hydraulic pump has first and second inlet/outlet ports having said hydraulic fluid introduced into said hydraulic pump and discharged out of said hydraulic pump therethrough, said hydraulic actuator has first and second ports having said hydraulic fluid introduced into and discharged out of said hydraulic actuator therethrough, said first and second inlet/outlet ports being connected with said first and second ports to allow said hydraulic fluid from said hydraulic pump to be introduced into said hydraulic actuator and to allow said hydraulic fluid from said hydraulic actuator to be returned to said hydraulic pump, and which further comprises a hydraulic pressure controller for controlling the hydraulic pressure in the hydraulic fluid discharged from said hydraulic pump.

11. A hydraulic system as set forth in claim 6, which further comprises a pressure compensator accommodated in said housing unit in association with said hydraulic actuator to compensate the hydraulic pressure in one of said pressure chambers of said hydraulic actuator to cause said piston rod assembly to be held at its retracted position.

12. A hydraulic system as set forth in claim 6, which further comprises an two-position solenoid valve provided between said hydraulic pump and said hydraulic actuator to assume a first position where the hydraulic fluid between said hydraulic pump and said hydraulic actuator is allowed to pass therethrough when said piston rod assembly is being moved toward its retracted position and its extended position, and a second position where the hydraulic fluid between said hydraulic pump and said hydraulic actuator is not allowed to pass therethrough when said piston rod assembly is held at its retracted position and its extended position.

13. A hydraulic system for retracting into and extending out of the body of an aircraft a landing gear for use in taking off and landing, comprising:

a housing unit formed with a pressure imparting port to have a hydraulic pressure of a hydraulic fluid pass therethrough and with a pressure inlet/outlet port to be connected with an up-lock cylinder to have a hydraulic pressure of a hydraulic fluid pass therethrough, a hydraulic pump accommodated in said housing unit to outlet therefrom and inlet therein a hydraulic fluid, a driving motor drivably connected with said hydraulic pump to impart rotation motion to said hydraulic pump, a hydraulic actuator accommodated in said housing unit and having a piston rod assembly received therein to be reciprocably moved by said hydraulic pump to assume two different positions consisting a retraction position where said piston rod assembly is positioned at its retracted position and locked by said up-lock cylinder and an extended position where said piston rod assembly is positioned at its extended position, a shuttle valve accommodated in said housing unit and positioned between said hydraulic pump and said hydraulic actuator and movable with respect to said housing unit to assume two different positions for selectively changing the flow of said hydraulic fluid between said hydraulic pump and said hydraulic actuator, an actuator pressure retaining mechanism accommodated in said housing unit to retain said hydraulic pressure in said hydraulic actuator, and a mechanically locking mechanism accommodated in said housing unit to lock said piston rod assembly with said housing unit when said hydraulic pump is not driven by said driving motor and to unlock said piston rod assembly from said housing unit to be freely moved when said hydraulic pump is driven by said driving motor.

14. A hydraulic system as set forth in claim 13, in which said driving motor is accommodated in said housing unit.

15. A hydraulic system as set forth in claim 13, in which said driving motor is attached to said housing unit.

16. A hydraulic system as set forth in claim 13, in which said hydraulic pump is constituted by a variable displacement pump.

17. A hydraulic system as set forth in claim 13, in which said hydraulic pump has first and second inlet/outlet ports having said hydraulic fluid introduced into said hydraulic pump and discharged out of said hydraulic pump therethrough, said hydraulic actuator has first and second ports having said hydraulic fluid introduced into and discharged out of said hydraulic actuator therethrough, said first and second inlet/outlet ports being connected with said first and second ports to allow said hydraulic fluid from said hydraulic pump to be introduced into said hydraulic actuator and to allow said hydraulic fluid from said hydraulic actuator to be returned to said hydraulic pump, and which further comprises a hydraulic pressure controller for controlling the hydraulic pressure in the hydraulic fluid discharged from said hydraulic pump.

* * * * *